United States Patent
Totsuka

(10) Patent No.: US 9,075,152 B2
(45) Date of Patent: Jul. 7, 2015

(54) DETECTION APPARATUS CONFIGURED TO DETECT SOFT X-RAY RADIATION AND DETECTION SYSTEM CONFIGURED TO DETECT SOFT X-RAY RADIATION

(75) Inventor: Hirofumi Totsuka, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 13/565,133

(22) Filed: Aug. 2, 2012

(65) Prior Publication Data

US 2013/0032724 A1 Feb. 7, 2013

(30) Foreign Application Priority Data

Aug. 5, 2011 (JP) .................................. 2011-171973

(51) Int. Cl.
*G01T 1/24* (2006.01)

(52) U.S. Cl.
CPC ...................................... *G01T 1/244* (2013.01)
USPC .................................................... 250/370.01

(58) Field of Classification Search
CPC ....... G01T 1/247; H01L 23/552; H01L 27/14; H01L 27/14601
USPC ................................................... 250/370.01
See application file for complete search history.

(56) References Cited

U.S. PATENT DOCUMENTS

| | | | | |
|---|---|---|---|---|
| 6,025,585 A | * | 2/2000 | Holland | 250/208.1 |
| 6,852,565 B1 | * | 2/2005 | Zhao | 438/73 |
| 7,145,986 B2 | * | 12/2006 | Wear et al. | 378/98.8 |
| 2009/0242781 A1 | * | 10/2009 | Atsuta et al. | 250/370.09 |

FOREIGN PATENT DOCUMENTS

| | | |
|---|---|---|
| JP | H06-302795 A | 10/1994 |
| JP | H10-289994 A | 10/1998 |
| JP | 2002-237614 A | 8/2002 |
| JP | 2005-333250 A | 12/2005 |
| JP | 2006-066710 A | 3/2006 |
| JP | 2006-148901 A | 6/2006 |
| JP | 2010080736 A | 4/2010 |
| JP | 2010-239076 A | 10/2010 |

* cited by examiner

*Primary Examiner* — David Porta
*Assistant Examiner* — Edwin Gunberg
(74) *Attorney, Agent, or Firm* — Canon USA Inc. IP Division

(57) ABSTRACT

A detection apparatus configured to detect soft X-ray radiation, includes a conversion unit and a circuit unit disposed on a semiconductor substrate. The conversion unit has a plurality of conversion elements that convert the soft X-ray radiation incident on the semiconductor substrate into electric charge. The circuit unit has an amplifier transistor that amplifies and outputs a signal supplied from the conversion unit. A shielding unit is disposed above the circuit unit. The shielding unit blocks the soft X-ray radiation incident on the circuit unit. Preferably, the soft X-ray shielding coefficient of a material that forms the shielding unit is higher than the soft X-ray shielding coefficient of each of aluminum and copper. Alternatively, a material that forms the shielding unit has an atomic number higher than or equal to 70.

29 Claims, 11 Drawing Sheets

DETECTION APPARATUS CONFIGURED TO DETECT SOFT X-RAY RADIATION AND DETECTION SYSTEM CONFIGURED TO DETECT SOFT X-RAY RADIATION

BACKGROUND

1. Field of the Invention

The embodiments of the present invention relate to an X-ray detection apparatus.

2. Description of the Related Art

In recent years, a solid-state image pickup device has been used for detecting X-ray radiation.

For example, Japanese Patent Laid-Open No. 2010-080736 describes a soft X-ray solid-state image pickup device using a charge-coupled device (CCD). Japanese Patent Laid-Open No. 2010-080736 also describes an example in which a transfer electrode of the CCD is formed from a member that blocks a soft X-ray.

SUMMARY

Accordingly, embodiments of the present invention are directed to a shielding structure capable of accurately detecting soft X-ray radiation in an X-ray detection apparatus including an amplifier unit that amplifies a signal generated by a conversion unit. In addition, embodiments of the present invention relate to an internal structure suitable for a semiconductor substrate of an X-ray detection apparatus including an amplifier unit that amplifies a signal generated by a conversion unit.

According to an embodiment of the present invention, an X-ray detection apparatus includes a semiconductor substrate including a conversion unit and a circuit unit and a shielding unit configured to reduce an amount of soft X-ray radiation incident on the semiconductor substrate. The conversion unit has a plurality of conversion elements disposed therein, and the conversion elements convert the soft X-ray radiation incident on the semiconductor substrate into electric charge. The circuit unit has a plurality of amplifier transistors disposed therein, and the amplifier transistors output a signal on the basis of the electric charge generated by the conversion elements. The shielding unit is disposed above gate electrodes of the amplifier transistors, and the shielding unit is disposed so that projection of at least a first part of the shielding unit onto the semiconductor substrate overlaps the circuit unit.

According to another embodiment of the present invention, an X-ray detection apparatus includes a semiconductor substrate including a conversion unit and a circuit unit and a shielding unit configured to reduce an amount of soft X-ray radiation incident on the semiconductor substrate. The conversion unit has a plurality of conversion elements disposed therein, and the conversion elements convert the soft X-ray incident on the semiconductor substrate. The circuit unit has a plurality of amplifier transistors disposed therein, and the amplifier transistors output a signal on the basis of electric charge generated by the conversion elements. Gate electrodes of the amplifier transistors are disposed on a first principal surface of two principal surfaces of the semiconductor substrate. The shielding unit is disposed on a second principal surface of the semiconductor substrate opposite to the first principal surface, and the shielding unit is disposed so that projection of at least first part of the shielding unit onto the semiconductor substrate overlaps the circuit unit.

According to still another embodiment of the present invention, an X-ray detection apparatus includes a semiconductor substrate including a conversion unit and a circuit unit and a shielding unit configured to reduce an amount of soft X-ray radiation incident on the semiconductor substrate. The conversion unit has a plurality of conversion elements disposed therein, and the conversion elements convert the soft X-ray incident on the semiconductor substrate. The circuit unit has a plurality of amplifier transistors disposed therein, and the amplifier transistors output a signal on the basis of electric charge generated by the conversion elements. Each of the conversion elements includes a first semiconductor region of a first conductive type into which the electric charge is collected and a second semiconductor region of a second conductive type disposed under the first semiconductor region. The circuit unit includes a third semiconductor region of the second conductive type having one of a source region and a drain region of each of the amplifier transistors disposed therein. A fourth semiconductor region of the first conductive type is disposed under the second semiconductor region and under the third semiconductor region. A lower end of the second semiconductor region is deeper than a lower end of the third semiconductor region in the semiconductor substrate.

According to the above-described embodiments, the X-ray detection apparatus can accurately detect soft X-ray radiation.

Further features of the present invention will become apparent from the following description of exemplary embodiments with reference to the attached drawings.

DESCRIPTION OF THE EMBODIMENTS

A main portion of an X-ray detection apparatus 100 according to an exemplary embodiment of the present invention is described below. X-ray radiation is at the short wavelength, high-energy end, of the electromagnetic spectrum. It is convenient to describe X-rays in terms of the energy they carry, i.e., in units of thousands of electron volts (keV). X-rays have energies ranging from less than 1 keV to greater than 100 keV. Hard X-rays are the highest energy X-rays, while the lower energy X-rays are referred to as "soft" X-rays. Accordingly, X-rays up to 10 keV (10 to 0.10 nm wavelength) are typically classified as soft X-rays, while hard X-rays are typically those with energies greater than around 10 keV. However, the distinction between hard and soft X-rays is not well defined. More relevant to the distinction of X-rays are the penetrating ability of the radiation, the instruments required to observe them, and the physical conditions under which the X-rays are produced.

The detection of X-rays requires that they interact with a volume of material within the detector, creating free electrons that are ultimately detected as an electric current. Hard X-rays can penetrate some solids and liquids, and all uncompressed gases, and their most common use is to image the inside of objects in diagnostic radiography and crystallography. By contrast, soft X-rays hardly penetrate matter at all; for example, the attenuation length of 0.6 keV (~2 nm) X-rays in water is less than 1 micrometer. In medical diagnostic applications, the low energy (soft) X-rays are typically unwanted because they are totally absorbed by the body, thereby causing an increase in the dose necessary for appropriate imaging. Hence, a thin metal sheet, often of aluminum, called an X-ray filter, is usually placed over the window of the X-ray tube, filtering out the low energy components in the spectrum. This reduces the intensity of the X-rays reaching the specimen under examination. Hence intensifying screens are used; intensifying screens allow a lower dose to the patient, because the screens take the X-ray information and intensify it so that it can be recorded more easily. More recently, solid-state image pickup devices have been proposed in which soft X-ray radiation is blocked at the surface of the detector itself.

Figure 1:
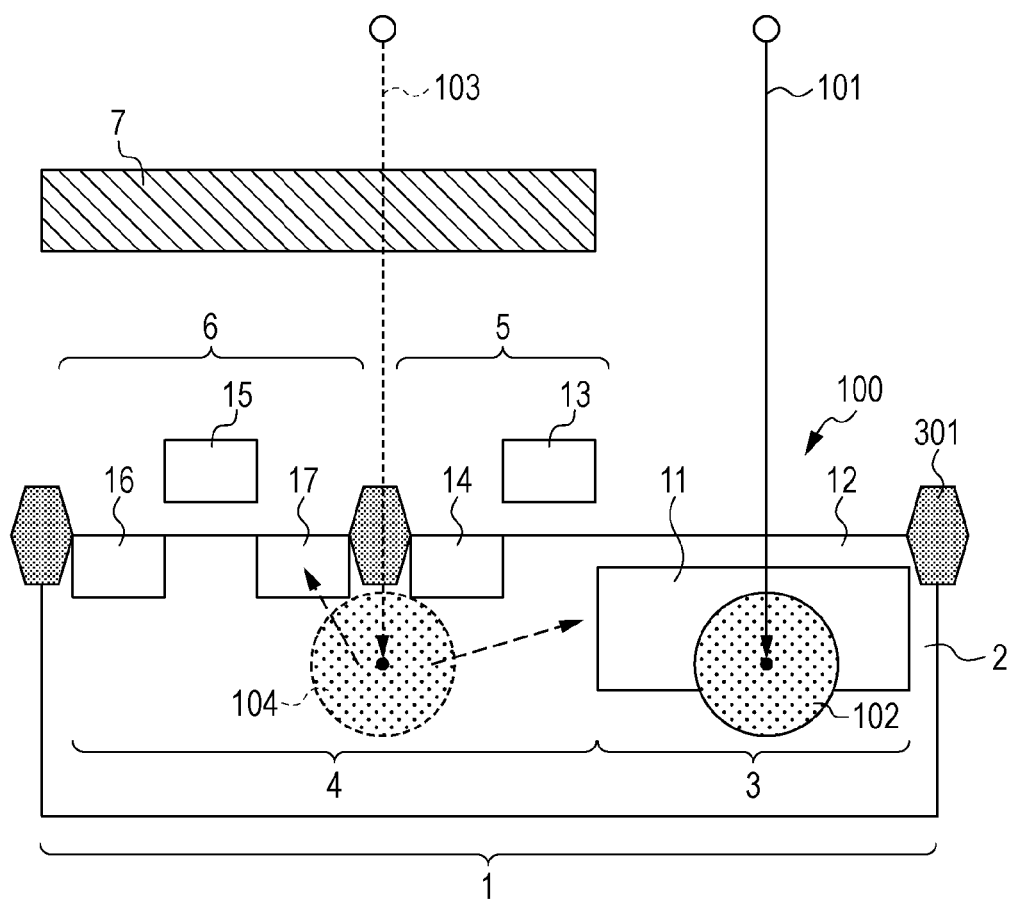
FIG. 1 is a schematic cross-sectional view of the X-ray detection apparatus according to a first exemplary embodiment.

As illustrated in FIG. 1, the X-ray detection apparatus 100 includes a semiconductor substrate 2. The semiconductor substrate 2 includes a conversion unit 3 and a circuit unit 4. The conversion unit 3 has a conversion element, such as a photodiode, disposed therein. The conversion unit 3 collects electric charge generated upon incidence of soft X-ray radiation. The circuit unit 4 includes an amplifier transistor 6 that amplifies a signal generated in the conversion unit 3. The amplifier transistor 6 serves as an amplifier unit that outputs a signal based on the electric charge generated in the conversion unit 3.

The conversion unit 3 and the circuit unit 4 form a detection unit 1. In FIG. 1, only one detection unit 1 is illustrated. However, according to the present exemplary embodiment, the X-ray detection apparatus 100 includes a plurality of detection units 1. The plurality of detection units 1 can be arranged in arrays such as a one-dimensional stripe array or a two-dimensional matrix array, as is the typical case in a CCD sensor. Regardless of the type of arrangement, each of the detection units includes at least the conversion unit 3 and the circuit unit 4. That is, according to the present exemplary embodiment, the X-ray detection apparatus 100 includes a plurality of conversion elements and a plurality of amplifier transistors.

The conversion units 3 included in the detection units 1 may be continuously arranged in accordance with the layout of the detection unit 1. Alternatively, like a layout in which an element isolation unit is disposed between every pair of the conversion units, the conversion units 3 of the detection units 1 may be separated from each other. In addition, the circuit units 4 included in the detection units 1 may be continuously disposed.

A shielding unit 7 is disposed above the circuit unit 4. When the shielding unit 7 is projected onto a principal surface of the semiconductor substrate 2 in a direction substantially perpendicular to the principal surface, part or the entirety of the shielding unit 7 is projected onto part or the entirety of the circuit unit 4. That is, the shielding unit 7 is disposed so as to overlap part or the entirety of the circuit unit 4. In other words, the shielding unit 7 covers part or the entirety of the circuit unit 4. Hereinafter, the term "disposing two members so that the two members overlap each other" refers to when one of the members is projected on a principal surface of the semiconductor substrate 2 in a direction perpendicular to the principal surface, projecting at least part of one member on at least part of the region of the other member, unless expressly specified otherwise. At that time, the two members may be in contact with each other. Alternatively, another member may be disposed between the two members. As used herein, a principal surface of the semiconductor substrate 2 is an interface surface between, for example, a layer formed from a semiconductor material and another material (e.g., an insulating material).

The shielding unit 7 has a portion of a layer located above the gate electrode 15 of the amplifier transistor 6. If the detection unit 1 includes a transistor, the layout of conductor members in a wiring layer including the gate electrode of the transistor may be restricted. Accordingly, in general, it is difficult to increase the shielding performance only by using the wiring layer including the gate electrode.

Therefore, according to the present exemplary embodiment, the shielding unit 7 that blocks the soft X-ray radiation incident on part of the circuit unit 4 is provided in a layer above the wiring layer including the gate electrode. In this way, the soft X-ray shielding performance can be increased. Note that the term "layer above the wiring layer including a gate electrode" refers to a layer that is farther from the semiconductor substrate than the wiring layer including the gate electrode.

The shielding unit 7 blocks part or all of the soft X-ray radiation that can be incident on the circuit unit 4. For example, a predetermined percentage of the soft X-ray radiation may pass through the shielding unit 7. In addition, part of the circuit unit 4 need not be covered by the shielding unit 7.

Part of the soft X-ray radiation that does not pass through the shielding unit 7 need not be absorbed by the shielding unit 7. For example, the part of the soft X-ray radiation can be prevented from entering the circuit unit 4 by scattering, diffraction, or reflection. In addition, the part of the soft X-ray radiation may be incident on the conversion unit 3 due to scattering, diffraction, or reflection.

It is desirable that the soft X-ray shielding coefficient of the material that forms the shielding unit 7 be higher than those of aluminum and copper. In addition, it is desirable that the material that forms the shielding unit 7 include an element having an atomic number greater than or equal to 70. This is because in general, an element having a higher atomic number has a higher soft X-ray shielding performance.

The shielding coefficient can be measured using, for example, the following technique. That is, a film having a predetermined thickness is formed using a material to be measured first. Subsequently, soft X-ray radiation having a predetermined amount of energy (predetermined strength) is emitted to the film, and the amount (the strength) of the soft X-ray radiation that has passed through the film is measured. In this manner, an amount of the soft X-ray radiation blocked by the film is measured. Thereafter, the ratio of the amount of the blocked soft X-ray radiation to the amount of the emitted soft X-ray radiation is defined as the shielding coefficient. That is, a material that allows a higher amount of the soft X-ray radiation to pass therethrough has a lower shielding coefficient. Conversely, a material that allows a lower amount of the soft X-ray radiation to pass therethrough has a higher shielding coefficient. In order to compare the shielding coefficients of different materials with each other, films having the same thickness are formed. Thereafter, the amounts of the soft X-ray radiation that pass through the films are compared. Alternatively, the amounts of blocked soft X-ray radiation may be normalized with respect to the thickness of the film, and the normalized values may be compared. Note that a soft X-ray radiation that is blocked by a film indicates the soft X-ray radiation that does not pass through the film. For example, the soft X-ray radiation does not pass through the film because the film absorbs, reflects, diffracts, or scatters the soft X-ray radiation.

An issue and an advantage of the present invention are described next. According to the present invention, by reading electric charge generated by soft X-ray radiation incident on the semiconductor substrate 2 in the form of a signal, the soft X-ray radiation can be detected. In addition, by reading almost all or all of electric charge generated by a single photon of soft X-ray radiation in the form of a signal, the energy of the detected soft X-ray radiation can be accurately measured.

At that time, by reducing the probability of reading only part of the generated electric charge in the form of a signal, the accuracy of the measurement of the energy of the soft X-ray radiation can be increased. In fact, if it is difficult to read all of the generated electric charge, the accuracy can be increased by discharging all of the generated electric charge and not reading the part of the electric charge as a signal. Such an advantage is described in more detail below.

Note that as the signal, only one of an electron and a positive hole can be read depending on the conductive type of conversion unit (e.g., a photodiode). In the following description, an electron is considered as a signal carrier. Alternatively, a positive hole may be considered as a signal carrier. Still alternatively, both an electron and a positive hole may be read as signal carriers.

Measurement of the energy of soft X-ray radiation (photon counting) is described first. If soft X-ray radiation is incident on the semiconductor substrate 2, a plurality of electron-hole pairs are generated. For example, soft X-ray radiation incident on the semiconductor substrate 2 ionizes electrons in an atom that forms the semiconductor substrate 2 (e.g., a silicon atom).

The number of the generated electron-hole pairs is proportional to the energy of the incident soft X-ray radiation. For example, if the semiconductor substrate 2 is a silicon substrate, the number of the generated electron-hole pairs can be obtained by dividing the energy of the incident soft X-ray radiation by the average ionization energy of silicon. When, for example, the average ionization energy of silicon is 3.65 eV (electron volt) and if the incident soft X-ray radiation has an energy of 1 keV, about 270 electron-hole pairs are generated.

Accordingly, the detection units are disposed so that the average number of soft X-ray photons incident on each of the detection units is less than or equal to one. Thereafter, by reading a signal obtained in accordance with the number of generated electrons, the energy of the incident soft X-ray radiation can be accurately measured. More specifically, assume that when one soft X-ray photon is incident on the soft X-ray detection apparatus, one of the detection units 1 outputs a signal that is equivalent to 270 electrons. Then, as described above, an energy of 3.65 eV is necessary for generating one electron. Accordingly, the calculated energy of the incident soft X-ray is about 1 keV (270 times 3.65 eV). In addition, assume that a signal that is equivalent to 540 electrons is output from one of the detection units 1. In such a case, the calculated energy of the incident soft X-ray is about 2 keV (540 times 3.65 eV).

The case where, unlike the above-described cases, the energy of soft X-ray radiation is not accurately measured is described next. For example, the case in which one soft X-ray photon having an energy of 2 keV is incident on one of the detection units 1 and 540 electrons are generated is discussed. If all of the 540 electrons can be read in the form of a signal, the energy of the incident soft X-ray radiation can be accurately measured, as described above. However, if, for some reason, a signal that is equivalent to 270 electrons is output from the detection unit 1, the energy of the soft X-ray radiation computed on the basis of the output signal is 1 keV (270 times 3.65 eV). That is, although the incident soft X-ray radiation has an energy of 2 keV, the result of the measurement indicates that the energy of the incident soft X-ray radiation is 1 keV. As described above, in some cases, the energy of soft X-ray radiation is not accurately measured.

One reason why a signal equivalent to only some of the generated electrons is output is that part of generated electric charge is discharged to a region other than a detection node. Such a problem occurs only on detection of soft X-ray radiation that generates a plurality of electrons for one incident photon. A mechanism by which some of the generated electrons are discharged when soft X-ray radiation is detected is described in more detail below.

When soft X-ray radiation is incident on some region, a plurality of electrons are generated in a region that is spatially wider than the region which soft X-ray photons hit. If the energy of the incident soft X-ray radiation is several keV, the region in which electrons are generated can extend to a several-micrometer region in the semiconductor substrate 2. That is, a plurality of electrons are not generated at one point in the semiconductor substrate, but are generated at a plurality of different points. For descriptive purposes, the three-dimensional region in which a plurality of electrons are generated is referred to as a "charge generation region". The location of the charge generation region varies with a point at which the soft X-ray radiation is incident. In addition, the size of the charge generation region may vary with the energy of the soft X-ray radiation. Examples of such a charge generation region are illustrated as a region 102 and a region 104 illustrated in FIG. 1. The charge generation region may be the smallest sphere 102, 104 that encloses a region in which electric charge is generated when a photon of the soft X-ray is incident on the semiconductor substrate.

The number of electrons that are read as a signal and the number of electrons that are discharged are determined by the location of the charge generation region in the detection unit 1 of the X-ray detection apparatus, that is, by the position at which the soft X-ray radiation is incident on the detection unit 1. The reason is described next with reference to FIGS. 12A to 12C.

Figure 12A:
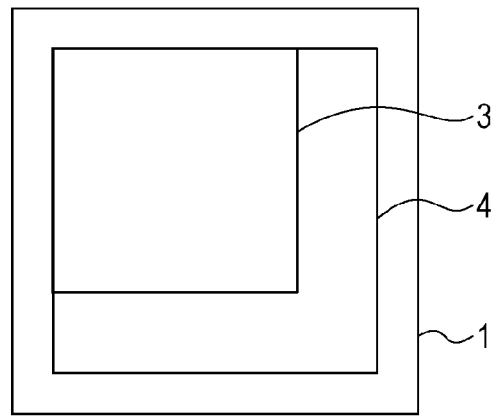
FIG. 12A is a schematic illustration of the planar structure of a detection unit of exemplary embodiments.
Figure 12B:
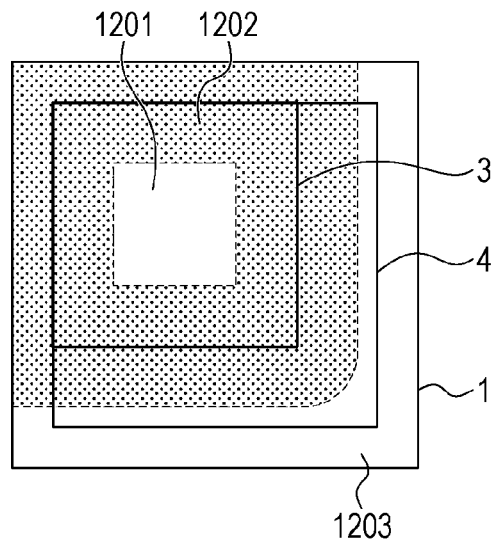
FIG. 12B is a schematic illustration of the planar structure of a detection unit of exemplary embodiments.

FIG. 12A illustrates the detection unit 1 of the X-ray detection apparatus. The detection unit 1 has the conversion unit 3 and the circuit unit 4 disposed therein. In FIG. 12B, the detection unit 1 illustrated in FIG. 12A is partitioned into three regions 1201 to 1203, for descriptive purposes.

The first region 1201 is located in substantially the middle of the conversion unit 3. If a soft X-ray is incident in the first region 1201, all generated electrons are collected by the conversion unit 3. This is because although electric charge is generated at a position distant from the position at which the soft X-ray is incident, the position is still inside the conversion unit 3. That is, since the entirety of the charge generation region is located inside the conversion unit 3, all of the generated electrons can be collected into the conversion unit 3 and can be read. Therefore, if a soft X-ray is incident in the first region 1201, the energy of the soft X-ray can be accurately measured.

In FIG. 12B, the second region 1202 is indicated by hatching. The second region 1202 includes the outer area of the conversion unit 3 and part of the area of the circuit unit 4. If soft X-ray radiation is incident in the second region 1202, some of the electrons may be collected by the conversion unit 3 and the other electrons may be discharged to the circuit unit 4. This is because the charge generation region extends across both the conversion unit 3 and the circuit unit 4. In such a case, the readout signal is equivalent to only some of the generated electrons. Accordingly, if a soft X-ray is incident in the second region 1202, it is difficult to accurately measure the energy of the soft X-ray radiation.

The third region 1203 is sufficiently distant from the conversion unit 3. If a soft X-ray is incident in the third region 1203, all of the generated electrons are discharged. This is because the charge generation region does not extend to the conversion unit 3. Accordingly, if a soft X-ray is incident in the third region 1203, the soft X-ray radiation is negligibly detected.

Which one of the first region 1201 to the third region 1203 receives the incident soft X-ray is determined by the statistical probability in accordance with the ratio among the areas of the first region 1201 to the third region 1203. More specifically, assume that the areas of the first region 1201 to the third region 1203 are in the ratio of 1:6:3. Detection of a soft X-ray in which one photon is incident on the detection unit 1 is performed 1000 times using the soft X-ray detection apparatus having such a ratio. In this case, a soft X-ray is incident in the first region 1201 about 100 times and, therefore, a signal that accurately indicates the energy of the soft X-ray is output each time. A soft X-ray is incident in the second region 1202 about 600 times and, therefore, a signal that does not accurately indicate the energy of the soft X-ray is output each time. A soft X-ray is incident in the third region 1203 about 300 times and, therefore, the soft X-ray is not detected.

As described above, in 700 out of 1000 detecting operations, signals are output. However, about 85% of the output signals do not accurately indicate the energy of the soft X-ray. In addition, it is difficult to determine which one of the first region 1201 and the second region 1202 receives the incident soft X-ray.

As a comparative example, an X-ray detection apparatus in which a soft X-ray is uniformly emitted to the entirety of the surface of the detection unit 1 is discussed. For example, an X-ray detection apparatus that does not have a shielding member for blocking a soft X-ray above the detection unit 1 is used as the comparative example. In such a case, signals that accurately indicate the energy and signals that do not accurately indicate the energy can be obtained in accordance with the ratio of the area of the first region 1201 to the area of the second region 1202. If, as described above, the area of the region 1201 and the area of the region 1202 are in the ratio of 1:6, only about 15% of the signals accurately indicate the energy. For the X-ray detection apparatus in which the amplifier transistor 6 is disposed in each of the detection units, it is difficult to make the area of the second region 1202 zero. Accordingly, it is difficult to accurately measure the energy of the soft X-ray radiation.

Figure 12C:
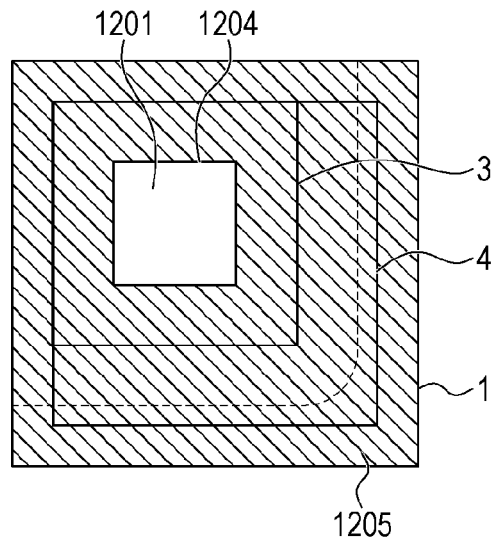
FIG. 12C is a schematic illustration of the planar structure of a detection unit of exemplary embodiments.

In contrast, FIG. 12C illustrates the soft X-ray detection apparatus according to an exemplary embodiment of the present invention. As illustrated in FIG. 12C, the soft X-ray detection apparatus includes a shielding unit 1205. The shielding unit 1205 has an opening 1204 at a position corresponding to the first region 1201.

Detection of a soft X-ray is performed 1000 times using the soft X-ray detection apparatus. In this case, a soft X-ray is incident in the first region 1201 about 100 times. The incidence of a soft X-ray is not detected about 900 times. This is because a soft X-ray that can be incident in a region other than the first region 1201 is blocked by the shielding unit 1205. As a result, the probability of a signal being output is reduced. However, almost all of the output signals accurately indicate the energy of the incident soft X-ray. Accordingly, the energy of the soft X-ray can be accurately measured.

In FIG. 12C, the entirety of the second region 1202 is covered by the shielding unit 1205. In such a structure, the advantage of the present invention can be increased. However, part of the second region 1202 need not be surrounded by the shielding unit 1205. For example, even when the conversion unit 3, which is part of the second region 1202, is not covered by the shielding unit 1205, the advantage of the present invention can be provided. This is because if a soft X-ray is incident at a position near the middle point of the conversion unit 3, which is part of the second region 1202, almost all of the generated electrons are collected by the conversion unit 3 and, therefore, the electrons can be read in the form of a signal. The measurement result differs from the actual energy of the incident soft X-ray by the discharged number of electrons. However, if the error is within the allowable range, part of the electric charge may be allowed to be discharged. That is, a region in which the shielding unit 1205 is disposed can be appropriately selected in accordance with a performance required for the soft X-ray detection apparatus. Note that the shielding unit 1205 need not be disposed at a position which the third region 1203 overlaps.

In FIGS. 12A to 12C, the border between the first region 1201 and the second region 1202 is determined by a distance from a region serving as a discharge portion of electric charge. This is because if the soft X-ray is incident at a point a predetermined distance L or more away from the discharge portion, an electron is not discharged. For example, the predetermined distance L can be determined so as to be equal to the radius of the smallest sphere that encloses the electron generation region. Alternatively, if the semiconductor substrate 2 is a silicon substrate, the predetermined distance L can be determined so as to be 0.5 micrometer. Still alternatively, the predetermined distance L (micrometer) may be determined as follows:

$$L = 0.85 \times E^{\frac{7}{4}} \times 10^{-2} \quad (1)$$

where E (keV) denotes the energy of the incident soft X-ray radiation.

Note that the entirety of the circuit unit 4 may be defined as the discharge portion of electric charge. Alternatively, the semiconductor region of the circuit unit 4 to which a power supply voltage is supplied or the semiconductor region serving as the source and the drain of a MOS transistor may be defined as the discharge portion of electric charge.

In summary, the X-ray detection apparatus may output a signal that accurately indicates the information regarding the soft X-ray radiation and a signal that does not accurately indicate the information regarding the soft X-ray radiation in accordance with a position at which the soft X-ray radiation is incident. According to the structure of the present exemplary embodiment, the percentage of output signals that accurately indicate the information regarding the soft X-ray radiation can be increased. As a result, the soft X-ray radiation can be more accurately detected.

For reference, the X-ray solid-state image pickup device described in Japanese Patent Laid-Open No. 2010-080736 is of a CCD type. Accordingly, only a conversion unit and a charge transfer unit are disposed in a detection unit and its vicinity. By setting the thickness of a signal carrier transfer electrode of the charge transfer unit to a predetermined film thickness, incident soft X-ray radiation is absorbed by the electrode and, therefore, the radiation that is directly incident on a vertical signal carrier transfer path, which may cause noise, can be blocked. In addition, Japanese Patent Laid-Open No. 2010-080736 describes the list of the materials of the signal carrier transfer electrode. In structures in which the detection unit does not include an amplifier unit and, therefore, a relatively large area of the conversion unit is available (e.g., the structure of a CCD)), only noise generated upon incidence of the radiation onto the transfer path needs to be taken into account. However, in structures in which the detection unit includes an amplifier unit, the area of a circuit unit in the detection unit is increased. Thus, as described above, the percentage of signals that do not accurately indicate the information regarding the soft X-ray radiation is increased. As a result, a shielding unit having a structure that differs from an existing structure is required.

First Exemplary Embodiment

The X-ray detection apparatus 100 according to a first exemplary embodiment of the present invention is described below. FIG. 1 is a schematic cross-sectional view of a detection unit 1 of the X-ray detection apparatus 100. In FIG. 1, only one detection unit 1 is illustrated. However, according to the present exemplary embodiment, a plurality of the detection units 1 are included in the X-ray detection apparatus 100.

The X-ray detection apparatus 100 according to the present exemplary embodiment can detect electromagnetic waves mainly in the wavelength range from 0.1 nm to 10 nm. As described above, if an electromagnetic wave in this wavelength range is incident on the semiconductor substrate, a plurality of electrons are generated for one photon, as described above.

Note that the X-ray detection apparatus 100 according to the present exemplary embodiment detects electromagnetic waves mainly in the wavelength range of 0.1 nm to 10 nm at the time that soft X-ray radiation is incident on the semiconductor substrate. Accordingly, the X-ray detection apparatus 100 that detects only an electromagnetic wave that is wavelength-converted to a wavelength range (e.g., a visible wavelength range) before the soft X-ray radiation is incident on the semiconductor substrate is not encompassed in the scope of the present invention. In other words, in accordance with the present embodiment, the X-ray detection apparatus 100 preferably detects only an electromagnetic wave in a wavelength range of 0.1 to 10 nm, but is insensitive to visible light. However, even when a wavelength converter used before soft X-ray radiation is incident on the semiconductor substrate is included in the X-ray detection apparatus, the present invention is applicable to the X-ray detection apparatus if the converted wavelength is within the above-described range of 0.1 nm to 10 nm.

According to the present exemplary embodiment, the X-ray detection apparatus 100 includes the semiconductor substrate 2. For example, the semiconductor substrate 2 is a P-type silicon substrate. According to the present exemplary embodiment, the detection unit 1 includes the conversion unit 3 and the circuit unit 4 disposed on the semiconductor substrate 2. At least part of the circuit unit 4 is covered by the shielding unit 7. The shielding unit 7 reduces the amount of soft X-ray radiation that can be incident on the circuit unit 4 and, more preferably, completely blocks such soft X-ray radiation.

The conversion unit 3 is formed from, for example, a photodiode. According to the present exemplary embodiment, the conversion unit 3 has an N-type semiconductor region 11 disposed therein. A P-type semiconductor region 12 is disposed on the side of the semiconductor region 11 adjacent to the surface of the semiconductor substrate 2 (a principal surface on which the soft X-ray radiation is incident). The N-type semiconductor region 11 forms P-N junction with each of the P-type semiconductor region 12 and the semiconductor substrate 2. That is, the P-type semiconductor region 12, the N-type semiconductor region 11, and the semiconductor substrate 2 form a buried type photodiode. Alternatively, the semiconductor substrate 2 may be formed from an N-type semiconductor substrate. A P-type semiconductor region (e.g., a P-type well) may be provided on the N-type semiconductor substrate. Thus, the P-type well, the N-type semiconductor region 11, and the P-type semiconductor region 12 can form a buried type photodiode. The potential of the N-type semiconductor region 11 with respect to an electron is lower than that of the P-type semiconductor region surrounding the N-type semiconductor region 11. Accordingly, electrons generated upon incidence of soft X-ray radiation can be collected into the N-type semiconductor region 11. Furthermore, electrons may be accumulated in the N-type semiconductor region 11. Before electrons are collected or accumulated in the N-type semiconductor region 11, a reverse bias may be applied to the N-type semiconductor region 11. The potential of the N-type semiconductor region 11 can be further reduced by the applied reverse bias. In addition, the entirety of the N-type semiconductor region 11 may be depleted by the reverse bias.

The circuit unit 4 has a transfer transistor 5 and an amplifier transistor 6 disposed therein. The transfer transistor 5 is configured so as to include a transfer gate electrode 13 and a floating diffusion node 14 (FD 14). The FD 14 is formed from an N-type semiconductor region which is electrically isolated from all other nodes. That is, FD 14 has "diffusion" due to the fact that this region is located in an N-type semiconductor region, and is "floating" because it is not connected to any of the fixed or controlled voltage nodes (its potential is "floating"). At least two voltages corresponding to ON and OFF of the transfer transistor 5 are applied to the transfer gate electrode 13. The potential between the N-type semiconductor region 11 of the conversion unit 3 and the FD 14 is controlled by the voltage applied to the transfer gate electrode 13. As a result, an electron generated in the conversion unit 3 can be transferred to the FD 14. At that time, all of the electrons in the conversion unit 3 may be transferred to the FD 14, or only some of the electrons may be transferred to the FD 14. If all the electric charge in the conversion unit 3 is transferred, the entirety of the N-type semiconductor region 11 is depleted. Accordingly, such a transfer operation is referred to as a "completely-depleted transfer operation".

The FD 14 is electrically connected to a gate electrode 15 of the amplifier transistor 6 via an interconnection line (not illustrated). In this way, the FD 14 forms part of an input portion of the amplifier unit. That is, the electrons generated upon incidence of the soft X-ray radiation are transferred to the FD 14, and an amplified signal in accordance with the number of charges of the FD 14 is output. Accordingly, the FD 14 can be also referred to as a "detection node".

The amplifier transistor 6 is formed from a MOS transistor including the gate electrode 15, a source region 16, and a drain region 17. Each of the source region 16 and the drain region 17 is formed from an N-type semiconductor region. That is, the amplifier transistor 6 is an N-channel MOS transistor. The gate electrode 15 of the amplifier transistor 6 forms part of the input portion of the amplifier unit. The drain region 17 is electrically connected to a power supply unit (not illustrated). The detection unit 1 further includes an element isolation unit 301.

The shielding unit 7 is disposed so as to overlap the transfer transistor 5 and the amplifier transistor 6. The shielding unit 7 is disposed in a layer above the gate electrode 15 of the amplifier transistor 6. The shielding unit 7 blocks soft X-ray radiation emitted to the circuit unit 4. The material that forms the shielding unit 7 is tantalum. It is desirable that the film thickness of the shielding unit 7 range from 0.5 micrometer to 1.0 micrometer. If the film thickness of the shielding unit 7 is less than 0.5 micrometer, a sufficient shielding performance may not be obtained. In contrast, if the film thickness of the shielding unit 7 is greater than 1.0 micrometer, a high stress is generated and, therefore, it is difficult to form the shielding unit 7. However, the film thickness of the shielding unit 7 may be outside the range from 0.5 micrometer to 1.0 micrometer, as needed. Note that the shielding unit 7 need not block all the emitted soft X-ray radiation. It is only required that the amount of the soft X-ray radiation incident on the circuit unit be reduced.

Figure 2:
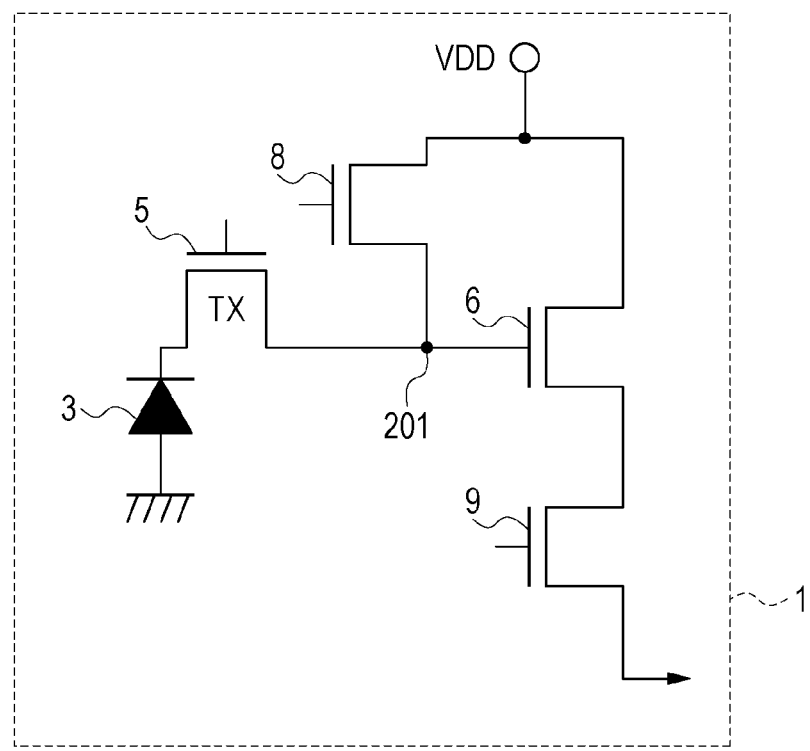
FIG. 2 is an equivalent circuit diagram of the X-ray detection apparatus according to the first exemplary embodiment.

FIG. 2 is an equivalent circuit diagram of the detection unit 1 of the X-ray detection apparatus 100 according to the present exemplary embodiment. The same reference symbol is used to indicate elements in FIGS. 2 and 1 which perform the same or a similar function, and detailed descriptions of the elements are not repeated.

The detection units 1 further includes a reset transistor 8 and a selection transistor 9. The anode of the photodiode serving as the conversion unit 3 is connected to a detection node 201 via the transfer transistor 5. The detection node 201 corresponds to the gate electrode 15 of the amplifier transistor 6 and the FD 14 illustrated in FIG. 1. According to the present exemplary embodiment, since the FD 14 and the gate electrode 15 of the amplifier transistor 6 are connected to each other, the both correspond to the detection node 201. That is, the detection node 201 also serves as an input node of the amplifier unit.

The drain of the reset transistor 8 receives a power supply voltage VDD. The source of the reset transistor 8 is connected to the detection node 201. The reset transistor 8 resets the voltage of the detection node 201 in accordance with the voltage supplied to the gate of the reset transistor 8. For example, the reset transistor 8 is formed from an N-channel MOS transistor.

The drain of the selection transistor 9 is connected to the source of the amplifier transistor 6. The source of the selection transistor 9 is connected to an output line (not illustrated). If the selection transistor 9 is turned on by the voltage supplied to the gate of the selection transistor 9, a signal in accordance with the voltage of the detection node 201 is output to the output line. That is, when signals are output from a plurality of the detection units 1 to a single output line, one of the detection units 1 that outputs the signal can be selected by using the selection transistor 9.

The need for the reset transistor 8 and the selection transistor 9 can be appropriately eliminated. For example, by controlling the voltage of the detection node 201 of a detection unit that is not selected to turn off the amplifier transistor 6, the need for the selection transistor 9 can be eliminated. Alternatively, in the case of a linear sensor, the need for the selection transistor 9 can be eliminated. Still alternatively, when the conversion unit 3 is formed from a phototransistor and if the generated electric charge is read in the form of a photo-electric current, the need for the reset transistor 8 can be eliminated.

Figure 3A:
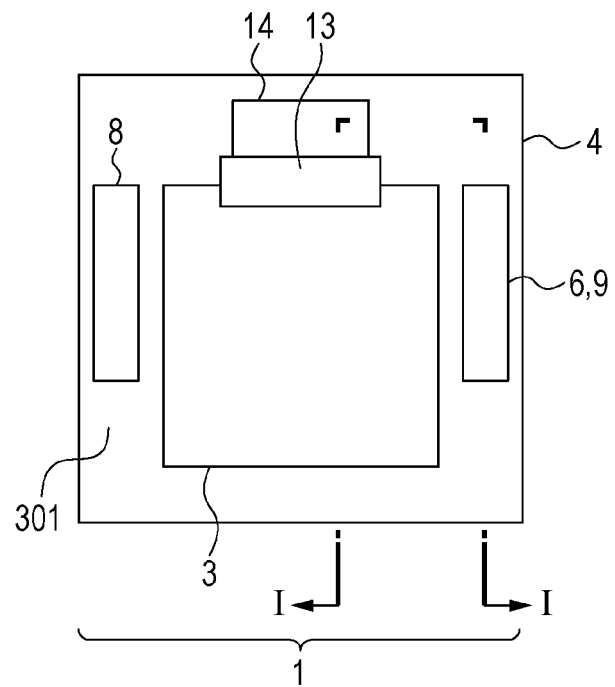
FIGS. 3A and 3B are schematic illustrations of the planar structure of the X-ray detection apparatus according to the first exemplary embodiment.
Figure 3B:
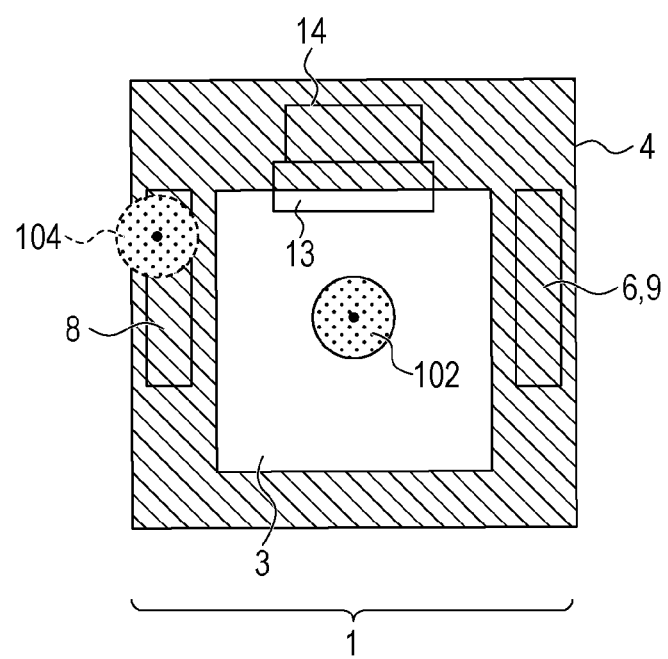

FIGS. 3A and 3B are schematic illustrations of the planar structure of the detection unit 1. In the view illustrated in FIG. 3A, the shielding unit 7 is not illustrated in order to illustrate more clearly the planar structure of the semiconductor substrate 2. In contrast, in the view illustrated in FIG. 3B, the shielding unit 7 is illustrated. FIG. 1 is a schematic illustration of the cross-sectional structure taken along a line I-I of FIG. 3A.

In FIG. 3A, a region having the N-type semiconductor region 11 disposed therein is indicated as the conversion unit 3. Similarly, in FIG. 3A, a region having the transfer gate electrode 13 disposed therein, a region having the FD 14 disposed therein, a region having the amplifier transistor 6 disposed therein, a region having the reset transistor 8 disposed therein, and a region having the selection transistor 9 disposed therein are indicated by using such reference numerals. For example, the reference numeral "8" indicates the region having the reset transistor 8 disposed therein. In plan view, the transfer gate electrode 13, the FD 14, and the transistors are arranged so as to surround the conversion unit 3. More specifically, in the region having each of the transistors disposed therein, a source region, a drain region, and a gate region are disposed. Although not illustrated in FIG. 3A, a semiconductor region for supplying a predetermined voltage to the semiconductor substrate 2 may be disposed. Furthermore, the semiconductor region for supplying a power supply voltage to the semiconductor substrate 2 may be disposed.

The above-described elements are electrically separated from each other by the element isolation unit 301. However, the element isolation unit 301 need not be disposed in a region having the transfer gate electrode 13 disposed therein between the conversion unit 3 and the FD 14. The element isolation unit 301 has an isolation structure using an oxide film. For example, the element isolation unit 301 is formed by shallow trench isolation (STI).

Note that the border between the conversion unit 3 and the circuit unit 4 of the detection unit 1 is determined on the basis of the planar structure of the detection units 1. A region of the detection unit 1 having the transfer transistor 5 (i.e., the transfer gate electrode 13 and the FD 14), the amplifier transistor 6, the reset transistor 8, the selection transistor 9, and the element isolation unit 301 disposed therein serves as the circuit unit 4. The border of the conversion unit 3 is determined by the border of, for example, the N-type semiconductor region 11. However, if the N-type semiconductor region 11 extends under another element, the border of the conversion unit 3 is determined by the edge of that element. In addition, the region having the element disposed therein is included in the circuit unit 4. For example, if the N-type semiconductor region 11 extends under the transfer gate electrode 13, the edge of the transfer gate electrode 13 is defined as the border of the conversion unit 3. In addition, the region having the transfer gate electrode 13 disposed therein is included in the circuit unit 4. That is, a region having an element other than the conversion element may be included in the circuit unit 4.

FIG. 3B is FIG. 3A after the shielding unit 7 has been additionally provided. The planar structure of the shielding unit 7 is described next with reference to FIG. 3B. Note that an element that is not necessary for description is removed from FIG. 3B even if the element is illustrated in FIG. 3A. According to the present exemplary embodiment, the shielding unit 7 overlaps the entirety of the circuit unit 4 in plan view. In contrast, the shielding unit 7 is disposed so as not to overlap the conversion unit 3. In this way, soft X-ray radiation 103 directed to the circuit unit 4 is blocked.

Note that in reality, a plurality of the detection units 1 each illustrated in FIGS. 3A and 3B are arranged. The plurality of the detection units 1 may be arranged in a symmetric fashion. For example, the arrangement of the detection units 1 may have translation symmetry formed by translating the detection unit 1 illustrated in FIGS. 3A and 3B in a specific direction for a specific distance. Alternatively, the arrangement of the detection units 1 may have symmetry with respect to a line. Still alternatively, the arrangement of the detection units 1 may have symmetry with respect to a point. By using a plurality of the detection units 1 arranged in a symmetric fashion, a variation in the property of a detection unit can be reduced. In particular, if the arrangement of the detection units 1 has translation symmetry, a variation in property due to a manufacturing process can be reduced. However, a structure including a plurality of the detection units 1 that are not arranged in a symmetric fashion can be still employed.

Figure 4:
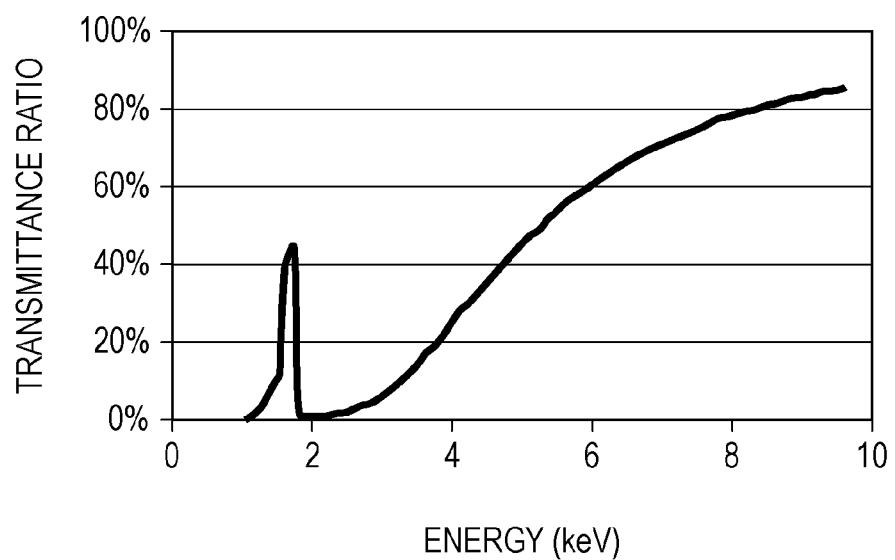
FIG. 4 is a graph illustrating the ratio of the soft X-ray transmittance of tantalum per unit thickness to that of aluminum.

The shielding performance of a material that forms the shielding unit 7 is described next. FIG. 4 is a graph comparing the soft X-ray transmittances of tantalum and aluminum. The ordinate of the graph represents the ratio of the transmittance per unit thickness of tantalum to that of aluminum. The abscissa represents the wavelength of soft X-ray radiation. That is, the transmittance ratio=the transmittance of tantalum/the transmittance of aluminum. Note that the transmittance is defined as the ratio of the amount of a transmitted soft X-ray radiation to a predetermined amount of the emitted soft X-ray radiation.

As illustrated in FIG. 4, the transmittance ratio for soft X-ray radiation having an energy lower than or equal to 10 keV is less than 100 percent. That is, for soft X-ray radiation having energy lower than or equal to 10 keV, the transmittance of tantalum is lower than the transmittance of aluminum. Thus, the shielding coefficient of tantalum is higher than the shielding coefficient of aluminum. In addition, although not illustrated in the graph, the shielding coefficient of tantalum is higher than the shielding coefficient of copper. By forming the shielding unit 7 using a material having a soft X-ray shielding coefficient that is higher than those of aluminum and copper, the soft X-ray radiation can be sufficiently blocked for the circuit unit 4.

In particular, the shielding coefficient of tantalum with respect to soft X-ray having an energy lower than or equal to 5 keV is twice the shielding coefficient of aluminum or higher. For example, to obtain the shielding performance that is the same as the shielding performance of the shielding unit 7 made of aluminum radiation with respect to soft X-ray radiation having an energy lower than or equal to 5 keV, the shielding unit 7 made of tantalum needs only a half the thickness of the shielding unit 7 made of aluminum. If the thickness of the shielding unit 7 is large, a high stress is generated. Thus, the reliability of the apparatus may be decreased. Therefore, if the shielding unit 7 is formed using a material having a shielding coefficient higher than that of aluminum, the balance between the shielding performance and the reliability can be advantageously easily optimized.

An advantage of the present exemplary embodiment is described next. Upon incidence of soft X-ray radiation 101 on the conversion unit 3, a plurality of electrons are generated in the vicinity of the conversion unit 3. That is, the location of a charge generation region 102 is close to the conversion unit 3. If the charge generation region 102 is located in the vicinity of the conversion unit 3, all or almost all of the electrons can be read in the form of a signal carrier.

However, if the soft X-ray radiation 103 is incident on the circuit unit 4, a plurality of electrons are generated at a location relatively far from the conversion unit 3. That is, a charge generation region 104 is far from the conversion unit 3. In such a case, only some of the generated electrons are collected by the conversion unit 3. In addition, the electrons that are not collected by the conversion unit 3 are discharged to, for example, the power supply unit.

In contrast, according to the present exemplary embodiment, the X-ray detection apparatus 100 includes the shielding unit 7 that blocks soft X-ray radiation 103 that can be incident on the circuit unit 4. The soft X-ray shielding coefficient of the material that forms the shielding unit 7 is high. Accordingly, the percentage of signals based on the soft X-ray radiation 103 incident on the circuit unit 4 being output can be reduced. In other words, the percentage of signals that do not accurately indicate the energy of the incident soft X-ray radiation being output can be reduced. As a result, the percentage of signals that accurately indicate the energy of the incident soft X-ray radiation being output can be increased. That is, the energy of the soft X-ray radiation can be accurately measured.

In addition, the shielding unit 7 can be formed of a material having a shielding coefficient that is higher than those of aluminum and copper. Furthermore, if the material has an atomic number of 70 or higher, the material has a shielding coefficient that is sufficient as the shielding coefficient of the shielding unit 7. Accordingly, the shielding unit 7 may be formed of a material having an atomic number of 70 or higher. According to such a structure, the soft X-ray radiation can be more accurately detected.

Modification of First Exemplary Embodiment

A modification of each of the elements of the first exemplary embodiment is described next. The following modifications can be combined as needed. In addition, the modifications are applicable to second to sixth exemplary embodiments described below.

While the first exemplary embodiment has been described with reference to the structure in which an electron serves as a signal carrier, a structure in which a hole serves as a signal carrier may be employed. In the structure in which a hole serves as signal electric charge, the conductive type of a semiconductor region is opposite to that used in the present exemplary embodiment. For example, the buried type photodiode has a structure in which the N-type semiconductor region, the P-type semiconductor region, and the N-type semiconductor region disposed in this order from the surface side. In addition, electric charge generated upon incidence of soft X-ray radiation is collected into the P-type semiconductor region. Furthermore, the FD 14 is configured so as to include a P-type semiconductor region.

In addition to a silicon substrate, the semiconductor substrate 2 may be formed from a semiconductor substrate of a variety of another type, such as a germanium substrate or a gallium arsenide substrate. The semiconductor substrate 2 may be either one of a P-type substrate and an N-type substrate. The semiconductor substrate 2 may be formed by epitaxial growth. Alternatively, the semiconductor substrate 2 may be a silicon on insulator (SOI) substrate. Still alternatively, a P-type well or an N-type well may be disposed in the semiconductor substrate 2 as needed. If a well is disposed in the semiconductor substrate 2, the semiconductor regions forming the conversion unit 3 and the amplifier transistor 6 are disposed inside the well.

In the first exemplary embodiment, at least two voltages corresponding to ON and OFF of the transfer transistor 5 are applied to the transfer gate electrode 13 of the transfer transistor 5. In addition, a medium voltage between the voltages corresponding to ON and OFF may be applied to the transfer gate electrode 13. Alternatively, only a constant voltage may be applied to the transfer gate electrode 13 so that a potential between the N-type semiconductor region 11 and the FD 14 is controlled to be constant. Note that the transfer transistor 5 is not essential. The need for the transfer transistor 5 may be eliminated as necessary. If the transfer transistor 5 is removed, the N-type semiconductor region 11 of the conversion unit 3 needs to be connected to the gate electrode of the amplifier transistor 6, for example.

Electrical connection between the FD 14 and the gate electrode 15 of the amplifier transistor 6 is achieved by using, for example, a metal wire, a contact plug that connects the metal wire to the FD 14, and a contact plug that connects the metal wire to the gate electrode 15. Alternatively, the gate electrode 15 may be in direct contact with the FD 14. Still alternatively, the FD 14 may be connected to the gate electrode 15 using a common contact plug that is connected to the FD 14 and the gate electrode 15. The contact plug is formed from, for example, tungsten.

In addition, a switch may be disposed in an electrical path between the FD 14 and the gate electrode 15 of the amplifier transistor 6. In such a structure, the FD 14 can temporarily hold electrons. That is, the FD 14 may function as the charge holding unit disposed for each of the detection units.

While the first exemplary embodiment has been described with reference to the amplifier transistor 6 formed from a MOS transistor, the amplifier transistor 6 may be formed from a variety of active elements, such as a bipolar transistor, a junction field effect transistor (JFET), or a static induction transistor (SIT). In addition, while the first exemplary embodiment has been described with reference to the amplifier transistor 6 that forms a source follower circuit, the amplifier unit may have another structure. For example, a voltage follower using an inverting amplifier circuit and an operating amplifier including a MOS transistor may be employed.

In FIG. 2, the selection transistor 9 is disposed in an electrical path between the source of the amplifier transistor 6 and the output line (not illustrated). However, the selection transistor 9 may be disposed between the drain of the amplifier transistor 6 and the power supply.

The FD 14, the amplifier transistor 6, the reset transistor 8, and the selection transistor 9 may be shared by the plurality of detection units 1. For example, the transfer gate electrode 13 may be disposed for the conversion unit 3 of each of the detection units 1, and the electron of each of the conversion units 3 may be independently transferred to the shared FD 14. In such a case, the amplifier transistor 6, the reset transistor 8, and the selection transistor 9 can be disposed for each of the detection units 1. Since a plurality of detection units 1 share these elements, the ratio of the area of the circuit unit 4 to the area of the conversion unit 3 can be reduced. Thus, the soft X-ray radiation can be more accurately detected.

The material that forms the shielding unit 7 is not limited to tantalum. In order to form the shielding unit 7, any material having a soft X-ray shielding coefficient that is higher than those of aluminum and copper can be used. Alternatively, any material having an atomic number greater than or equal to 70 can be used. If easily performing a semiconductor process is taken into account, the material may be tantalum, tungsten, or gold, for example. Alternatively, the material may be a metal alloy composed primarily of tantalum, tungsten, or gold (i.e., a primary component). As used herein, the term "primary component" refers to a component that is a constituent of a chemical compound or a mixture having the highest composition ratio.

In addition, the shielding unit 7 need not be formed as a single layer. The shielding unit 7 may be formed as a multi-layer including an insulating film, such as a silicon oxide film, as a middle layer. In the case of a multilayer, even when the thickness of each layer is reduced in order to reduce the stress, a high shielding performance can be obtained. In the case of a multilayer, the following structure may be employed: a structure in which the shielding unit 7 serving as a first layer is disposed on part of the circuit unit 4, the shielding unit 7 serving as a second layer different from the first layer is not disposed, but the shielding unit 7 serving as the second layer is disposed on another part of the circuit unit 4. By shielding different regions of the circuit unit 4 using different layers in this manner, the layout can be flexibly changed. In addition, if the shielding unit 7 is formed of a conductive material, the shielding unit 7 may also serve as an interconnection line. For example, the shielding unit 7 may connect the transistors to one another or supply power to the semiconductor substrate 2 and the circuit unit 4.

As illustrated in FIG. 3B, the shielding unit 7 is disposed so as to overlap the entirety of the region of the circuit unit 4. However, the shielding unit 7 can be disposed over only part of the region of the circuit unit 4. That is, the shielding unit 7 need not be disposed over some part of the region of the circuit unit 4. For example, the shielding unit 7 need not be disposed over the transfer gate electrode 13 and the FD 14. Alternatively, the shielding unit 7 need not be disposed over the element isolation unit 301 that is immediately adjacent to the conversion unit 3. Still alternatively, the shielding unit 7 may be disposed so as to cover only the amplifier transistor 6. Yet still alternatively, the shielding unit 7 may be disposed so as to cover only the reset transistor 8.

As the shielding unit 7 is disposed so as to overlap a more region of the circuit unit 4, the energy of the soft X-ray radiation can be more accurately detected. If the shielding unit 7 is disposed so as to overlap the entirety of the circuit unit 4, the energy of the soft X-ray radiation can be more accurately detected.

Alternatively, the shielding unit 7 may be disposed over only the region of the circuit unit 4 that is close to the conversion unit 3. If the shielding unit 7 may be disposed over, in particular, the region of the circuit unit 4 that is close to the conversion unit 3, the energy of the soft X-ray radiation can be sufficiently accurately detected. This is because if the soft X-ray radiation is incident in the region that is close to the conversion unit 3, it is highly likely that some of the generated electrons are collected by the conversion unit 3 and the other electrons are discharged.

The shielding unit 7 need not be disposed over a region of the circuit unit 4 that is far from the conversion unit 3. This is because if the soft X-ray radiation is incident in the region of the circuit unit 4 that is far from the conversion unit 3, it is highly likely that all of the generated electrons are discharged. More specifically, the shielding unit 7 need not be disposed in a region that is 1 micrometer or more distant from the edge of the conversion unit 3. This is because even when an electron is generated in a region that is 1 micrometer or more distant from the edge of the conversion unit 3, the electron is negligibly collected by the conversion unit 3. For example, by not disposing the shielding unit 7 over a region of the circuit unit 4 a predetermined distance or more away from the conversion unit 3, the layout of the wiring and contact plugs can be made more flexible.

Among the elements disposed in the circuit unit 4, some can be selected as elements that should be shielded, and the others can be selected as elements that need not be shielded. For example, if the shielding unit 7 is disposed in a region in which the electric charge is discharged or a region close to that region, the soft X-ray radiation can be more accurately detected. Examples of such a region include the power supply unit and a semiconductor region electrically connected to the power supply unit. In contrast, the shielding unit 7 need not be disposed in a region in which the electric charge is accumulated. For example, the shielding unit 7 need not be disposed over an FD and a capacitative element.

Existing CCD X-ray image pickup apparatuses do not include a circuit unit inside a detection unit. Accordingly, a light shielding structure of the circuit unit including an amplifier unit is not studied. As described above, by appropriately designing a light shielding structure for the detection unit including the amplifier unit, the soft X-ray radiation can be more accurately detected.

Although not illustrated in FIG. 1, a plurality of wiring layers may be provided in addition to the shielding unit 7. Each of the wiring layers includes a conductive member for connecting the transistors and the FD 14 to one another and a conductive member for supplying a power supply voltage and the ground voltage. The conductive members are formed from, for example, aluminum or copper. In particular, a material having an electric conductivity higher than that of a material that forms the shielding unit 7 may be used for the conductive members. Each of aluminum and copper has an electric conductivity higher than that of tantalum. An interlayer insulating film is disposed between two of the wiring layers. The conductive members in different wiring layers are electrically insulated by the interlayer insulating film. A conductive material that serves as a barrier metal can be disposed between the conductive member and the interlayer insulating film as needed. Titanium, a titanium alloy, tantalum, or a tantalum alloy is used as the barrier metal. The barrier metal may reduce diffusion of metal atoms that form the conductive member in contact with the barrier metal. In such a case, it is desirable that the diffusion coefficient of the metal that forms the conductive member in contact with the barrier metal be lower than the diffusion coefficient of the interlayer insulating film. If the same material (e.g., tantalum) is used for the shielding unit 7 and the barrier metal, it is desirable that the thickness of the shielding unit 7 be greater than the thickness of the barrier metal.

The shielding unit 7 can be user as an interconnection line. That is, the shielding unit 7 may transfer a signal or supply a power supply voltage. If an interconnection line also functions as the shielding unit 7 in this manner, it is desirable that the interconnection line be configured so as to include a material having a soft X-ray shielding performance higher than that of a material of another interconnection line. Alternatively, it is desirable that the thickness of the interconnection line that also functions as the shielding unit 7 be greater than the thickness of another interconnection line.

An absorbing unit that absorbs soft X-ray radiation may be disposed on a principal surface of the semiconductor substrate 2 opposite to a principal surface of the semiconductor substrate 2 on which soft X-ray radiation is incident. Since the absorbing unit absorbs a soft X-ray radiation that has passed through the semiconductor substrate 2, the probability of the soft X-ray radiation that has passed through the semiconductor substrate 2 having a negative impact on the other portion of the X-ray detection apparatus can be reduced.

The example in which the element isolation unit 301 is formed from STI has been described with reference to FIG. 3A. However, the element isolation unit 301 may be formed through a local oxidation of silicon (LOCOS) isolation process. In addition, a semiconductor region having a conductive type that is opposite to the conductive type of a region into which the electric charge of the conversion unit may be disposed under the oxide film used in STI or LOCOS isolation. Alternatively, the element isolation unit 301 may be formed through PN-junction isolation without using an oxide film. Still alternatively, these element isolation structures may be employed at the same time.

When PN-junction isolation is employed or the semiconductor region having an opposite conductive type is disposed under the oxide film, the P-type semiconductor region is disposed so as to be in contact with the N-type semiconductor region 11. In such a structure, a depletion layer extends to the N-type semiconductor region and the P-type semiconductor region. A portion of the P-type semiconductor region in which the depletion layer is generated can be considered as part of the conversion unit 3. That is, if electric charge generated in some portion is collected into a predetermined region, such a portion can be part of the conversion unit 3.

A filter that blocks an electromagnetic wave having a predetermined wavelength may be disposed on the conversion unit 3. In this way, soft X-ray radiation in a wavelength range to be mainly detected by the conversion unit 3 is incident on the conversion unit 3. Accordingly, the soft X-ray radiation can be more accurately detected.

Second Exemplary Embodiment

Figure 5:
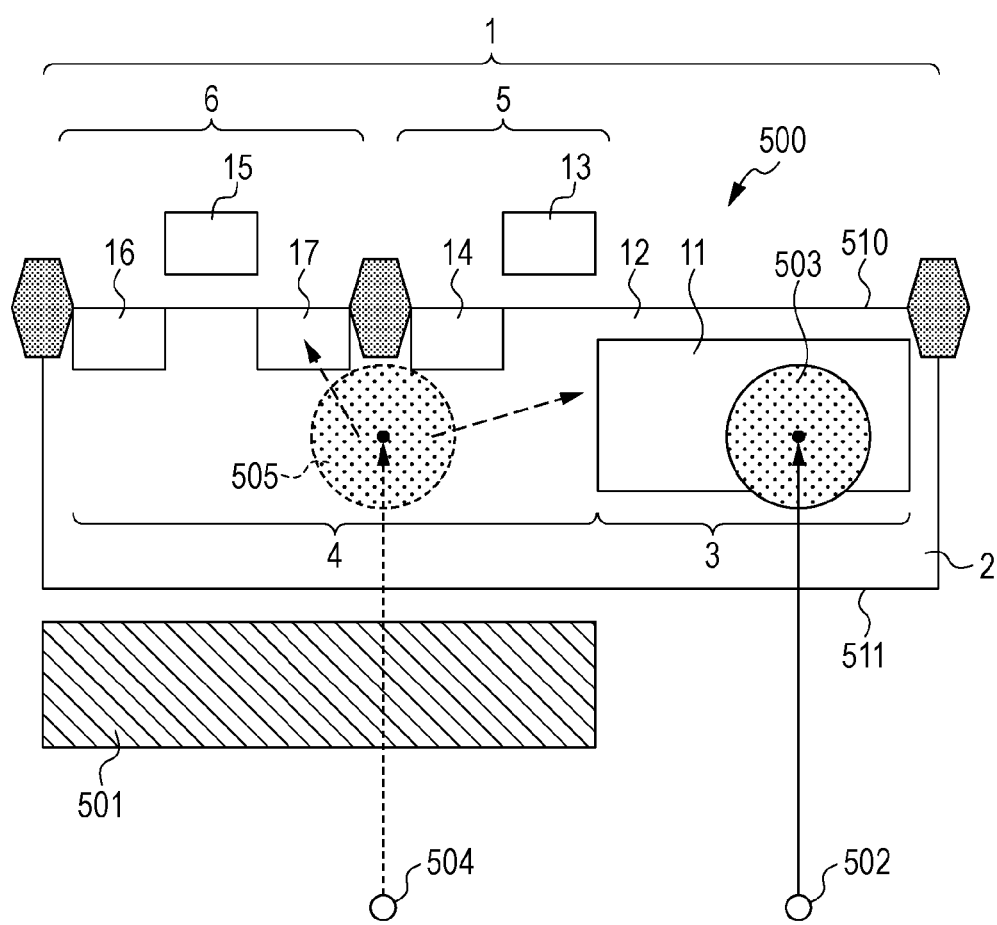
FIG. 5 is a schematic illustration of the planar structure of an X-ray detection apparatus according to a second exemplary embodiment.

An X-ray detection apparatus 500 according to a second exemplary embodiment of the present invention is described below. FIG. 5 is a schematic illustration of the planar structure of a detection unit 1 of the X-ray detection apparatus 500. The same reference symbol is used for a component which performs the same or a similar function as a component illustrated in FIG. 1 (the first exemplary embodiment), and description of already described components is not repeated. The second exemplary embodiment differs from the first exemplary embodiment in terms of the layout of a shielding unit 501 and the incidence direction of the soft X-ray radiation. A structure that differs from that of the first exemplary embodiment is described below. The other structures can be the same as those of the first exemplary embodiment.

As illustrated in FIG. 5, the transfer gate electrode 13 of the transfer transistor 5 and the gate electrode 15 of the amplifier transistor 6 are disposed so as to be adjacent to a first principal surface 510 of the semiconductor substrate 2. In addition, interconnection lines may be disposed so as to be adjacent to a first principal surface 510. The shielding unit 501 is disposed so as to adjacent to a second principal surface 511 of the semiconductor substrate 2. The second principal surface 511 is opposite to the first principal surface 510. That is, one of the two principal surfaces of the semiconductor substrate 2 that face each other is the first principal surface 510, and the other principal surface is the second principal surface 511. According to the present exemplary embodiment, soft X-ray radiation (X-rays 502 and 504) is incident on the semiconductor substrate 2 in a direction from the second principal surface 511 to the first principal surface 510. That is, the X-ray detection apparatus 500 is of a back illuminated type.

In the back illuminated X-ray detection apparatus 500, soft X-ray radiation is incident on a principal surface of the semiconductor substrate 2 (i.e., the second principal surface 511) that differs from a principal surface on which transistors and interconnection lines are disposed (i.e., the first principal surface 510). Accordingly, the opening of the conversion unit 3 formed on the soft X-ray radiation incidence side can be increased and, therefore, the sensitivity can be increased. In general, to maximize such an advantage, back illuminated sensors do not have a structure that blocks light or an electromagnetic wave on the light incidence side.

However, even when a back illuminated X-ray detection apparatus is employed, the soft X-ray 504 may be incident on a circuit unit 4 and, thus, a signal that does not accurately indicate the energy of the soft X-ray 504 may be still output. This is because when a plurality of electrons is generated upon incidence of the soft X-ray 504, a charge generation region 505 extends to a size on the order of micrometers. Accordingly, some of the electrons may be absorbed by the power supply unit of a circuit several micrometers away from the incidence surface, and the other electrons may be collected by the conversion unit 3. Even when the thickness of the semiconductor substrate 2 is increased, the soft X-ray 504 may reach the deep portion of the semiconductor substrate 2. Therefore, a plurality of electrons may be generated in the circuit unit 4 in the vicinity of the first principal surface 510. That is, a charge generation region 505 may be located in the vicinity of the circuit unit 4. Thus, in the case of a back illuminated soft X-ray detection apparatus, by blocking the soft X-ray 504 incident on the circuit unit 4 using the shielding unit 501, the soft X-ray radiation can be accurately detected.

Among the X-ray detection apparatuses of the present invention, in some cases, the back illuminated X-ray detection apparatuses do not have a transistor on the light incidence side. Accordingly, the shielding unit 501 need not be always located in a layer above the wiring layer of the gate electrode of a transistor.

Note that the equivalent circuit and the planar structure of the detection unit 1 according to the present exemplary embodiment can be the same as those of the detection unit 1 according to the first exemplary embodiment. In addition, the modification of the first exemplary embodiment is applicable to the present exemplary embodiment. Furthermore, any interconnection line and gate electrode other than the shielding unit 501 need not be disposed on the side of the semiconductor substrate 2 adjacent to the second principal surface 511. Alternatively, in addition to the shielding unit 501, an interconnection line and a gate electrode may be disposed on the side of the semiconductor substrate 2 adjacent to the second principal surface 511. In addition, even in back illuminated X-ray detection apparatuses, like the back illuminated X-ray detection apparatus according to the present exemplary embodiment, an X-ray absorbing member may be disposed on a side opposite to the soft X-ray radiation incidence surface (i.e., the side adjacent to the first principal surface 510).

In the first exemplary embodiment, if the N-type semiconductor region 11 extends under another element, the edge of the element is considered as the border of the conversion unit 3. This also applies to a back illuminated X-ray detection apparatus. In the case of a back illuminated X-ray detection apparatus, in order to increase a light receiving surface, the N-type semiconductor region 11 that forms the conversion unit may be disposed so as to overlap, for example, the amplifier transistor 6 and the reset transistor 8. Even in such a case, a region having the amplifier transistor 6 and the reset transistor 8 disposed therein serves as the circuit unit 4.

Third Exemplary Embodiment

Figure 6:
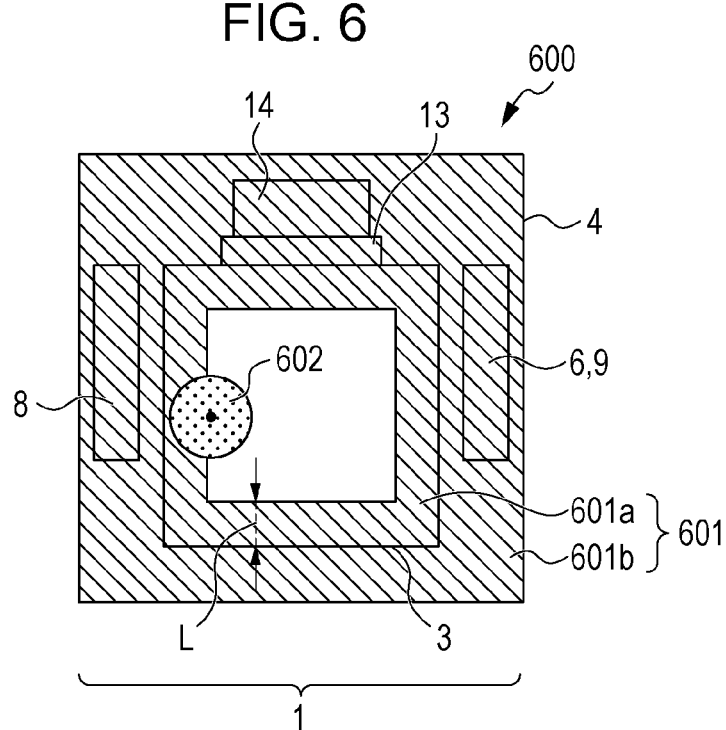
FIG. 6 is a schematic illustration of the planar structure of an X-ray detection apparatus according to a third exemplary embodiment.

An X-ray detection apparatus 600 according to a third exemplary embodiment of the present invention is described below. FIG. 6 is a schematic illustration of the planar structure of a detection unit 1 of the X-ray detection apparatus 600. The same reference symbol is used for an element which performs the same or a similar function as the element illustrated in FIGS. 3A and 3B (the first exemplary embodiment), and detailed description of the component is not repeated. The third exemplary embodiment differs from the first and second exemplary embodiments in terms of the layout of a shielding unit 601. A structure that differs from those of the first and second exemplary embodiments is described below. The other structures can be the same as those of the first and second exemplary embodiments.

According to the third exemplary embodiment, part of the shielding unit 601 is disposed above the conversion unit 3. In the following description, a portion of the shielding unit 601 that is located above the conversion unit 3 is referred to as a "first portion 601a", and a portion of the shielding unit 601 that is located above the circuit unit 4 is referred to as a "second portion 601b".

The first portion 601a is disposed above a region of the conversion unit 3 that is close to the circuit unit 4. The first portion 601a and the second portion 601b may be continuous. That is, the shielding unit 601 formed as a single layer may extend above a region extending from the circuit unit 4 to the conversion unit 3. Since, in plan view, a region where the conversion unit 3 or the circuit unit 4 is exposed between the first portion 601a and the second portion 601b can be eliminated, the shielding performance can be increased.

Alternatively, the first portion 601a and the second portion 601b may be formed as different layers. That is, the distance between the surface of the semiconductor substrate 2 and the first portion 601a can differ from the distance between the surface of the semiconductor substrate 2 and the second portion 601b. In this case, the first portion 601a and the second portion 601b may extend so as to overlap each other. Since, in plan view, a region where the conversion unit 3 or the circuit unit 4 is exposed between the first portion 601a and the second portion 601b can be eliminated, the shielding performance can be increased.

Alternatively, a connecting portion of the first portion 601a and the second portion 601b formed as different layers may be included in the shielding unit 601. In this way, even when the first portion 601a and the second portion 601b do not overlap each other, the shielding performance can be increased. However, the first portion 601a may be separated from the second portion 601b.

As illustrated in FIG. 6, a region of the conversion unit 3 within a predetermined distance L from the boundary between the conversion unit 3 and the circuit unit 4 may be completely covered by the first portion 601a. At that time, the shielding unit 601 need not be disposed in the entirety of a region of the conversion unit 3 outside the predetermined distance L from the boundary. Alternatively, the first portion 601a of the shielding unit 601 may be disposed in part of the region of the conversion unit 3 outside the predetermined distance L from the boundary.

Figure 7:
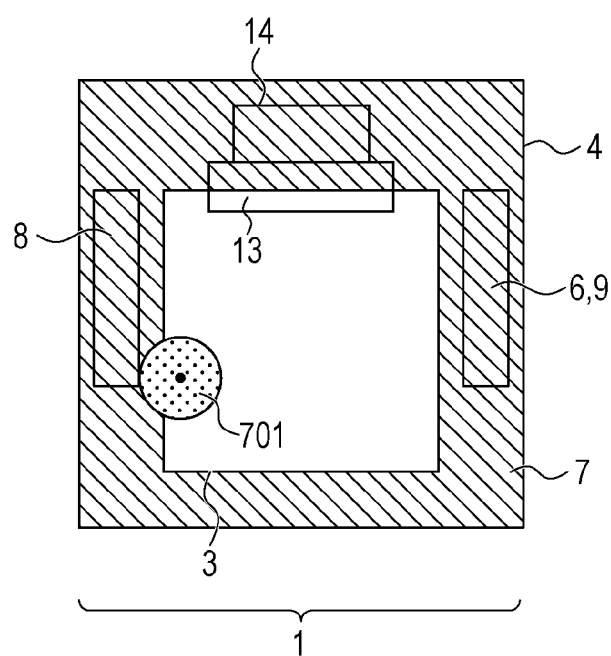
FIG. 7 is a schematic illustration of the planar structure of an X-ray detection apparatus according to the first exemplary embodiment.

An advantage of the present exemplary embodiment is described next. As a comparative example, an X-ray detection apparatus in which the shielding unit 7 is not disposed above the conversion unit 3, that is, one of variations of the first exemplary embodiment is discussed. FIG. 7 is a schematic illustration of the planar structure of a detection unit 1 of such an X-ray detection apparatus. In FIG. 7, the same reference symbol is used for a component which performs the same or a similar function as a component illustrated in FIG. 1, and description of the component is not repeated.

As illustrated in FIG. 7, if soft X-ray radiation is incident in a region of the conversion unit 3 in the vicinity of the circuit unit 4, a charge generation region 701 extends across the conversion unit 3 and the circuit unit 4. Accordingly, some of the generated electrons are discharged to, for example, a power supply unit in the circuit unit 4, and the other electrons are collected by the conversion unit 3.

In contrast, according to the present exemplary embodiment, the first portion 601a of the shielding unit 601 is disposed in a region of the conversion unit 3 within a predetermined distance from the boundary between the conversion unit 3 and the circuit unit 4. Hereinafter, let L denote the predetermined distance. In this way, soft X-ray radiation that is incident in the boundary region can be blocked. As a result, the percentage of signals that does not accurately indicate the energy of the incident soft X-ray radiation being output can be reduced. That is, as compared with the first exemplary embodiment, the soft X-ray can be more accurately detected. Furthermore, if the first portion 601a is disposed over the entirety of a region of the conversion unit 3 within the predetermined distance L from the boundary between the conversion unit 3 and the circuit unit 4, almost all of the electrons generated by a soft X-ray 602 incident on the conversion unit 3 can be collected. That is, the percentage of output signals that do not accurately indicate the energy of the soft X-ray can be further reduced. By disposing the shielding unit 601 over the conversion unit 3 in this manner, the soft X-ray radiation can be more accurately detected.

The predetermined distance L can be set as needed. For example, the predetermined distance L can be set in accordance with the size of the charge generation region determined when the soft X-ray radiation to be detected is incident on the semiconductor substrate 2. If the predetermined distance L is greater than the average radius of the charge generation regions, it is likely to provide a high shielding performance. More specifically, the predetermined distance L can be set so as to be greater than the radius of the smallest imaginary sphere that encloses the charge generation region.

Alternatively, the predetermined distance L may be set on the basis of the size of the conversion unit 3. If the predetermined distance L is reduced relative to the size of the conversion unit 3, the sensitivity is not decreased. As the predetermined distance L is increased more, the performance of preventing discharge of an electron to the circuit unit 4 becomes higher. However, at the same time, the probability of the soft X-ray radiation being incident on the conversion unit 3 is decreased. That is, there is a tradeoff between the sensitivity and the accuracy of soft X-ray detection. Accordingly, the predetermined distance L is appropriately set in accordance with the required performance. For example, when the energy of a soft X-ray to be detected is less than or equal to 10 KeV and if the size of the detection unit is about 10 micrometer, the predetermined distance L can be in the range from 0.1 micrometer to 2.0 micrometer.

Alternatively, the predetermined distance L (micrometer) may be set as follows:

$$L = 0.85 \times E^{\frac{7}{4}} \times 10^{-2} \quad (1)$$

where E (keV) denotes the energy of the incident soft X-ray radiation.

Note that the shielding unit 601 need not be disposed over a region of the conversion unit 3 within the predetermined distance L from the boundary. A region of the conversion unit 3 having the first portion 601a disposed thereabove can be changed as needed.

According to the present exemplary embodiment, the shielding unit 601 is disposed so as to overlap the N-type semiconductor region 11. However, as described in the modification of the first exemplary embodiment, a portion of the P-type semiconductor region that is immediately adjacent to the N-type semiconductor region 11 in the planar direction and that generates a depletion layer may be part of the conversion unit 3. In such a case, the shielding unit 601 can be disposed so as to overlap the region within the predetermined distance L without disposing the shielding unit 601 so that the shielding unit 601 overlaps the N-type semiconductor region 11.

The equivalent circuit and the cross-sectional structure of the detection unit 1 according to the present exemplary embodiment can be the same as those of the first exemplary embodiment or the second exemplary embodiment. In addition, the modification described in the first exemplary embodiment is applicable to the present exemplary embodiment. The boundary between the conversion unit 3 and the circuit unit 4 is the same as that described in the first exemplary embodiment or the second exemplary embodiment. Note that the structure of the present exemplary embodiment in which a shielding unit is disposed in a different layer is applicable to the first and second exemplary embodiments. That is, the shielding unit 7 disposed so as to overlap the circuit unit 4 may include two portions disposed in different layers.

Fourth Exemplary Embodiment

Figure 8:
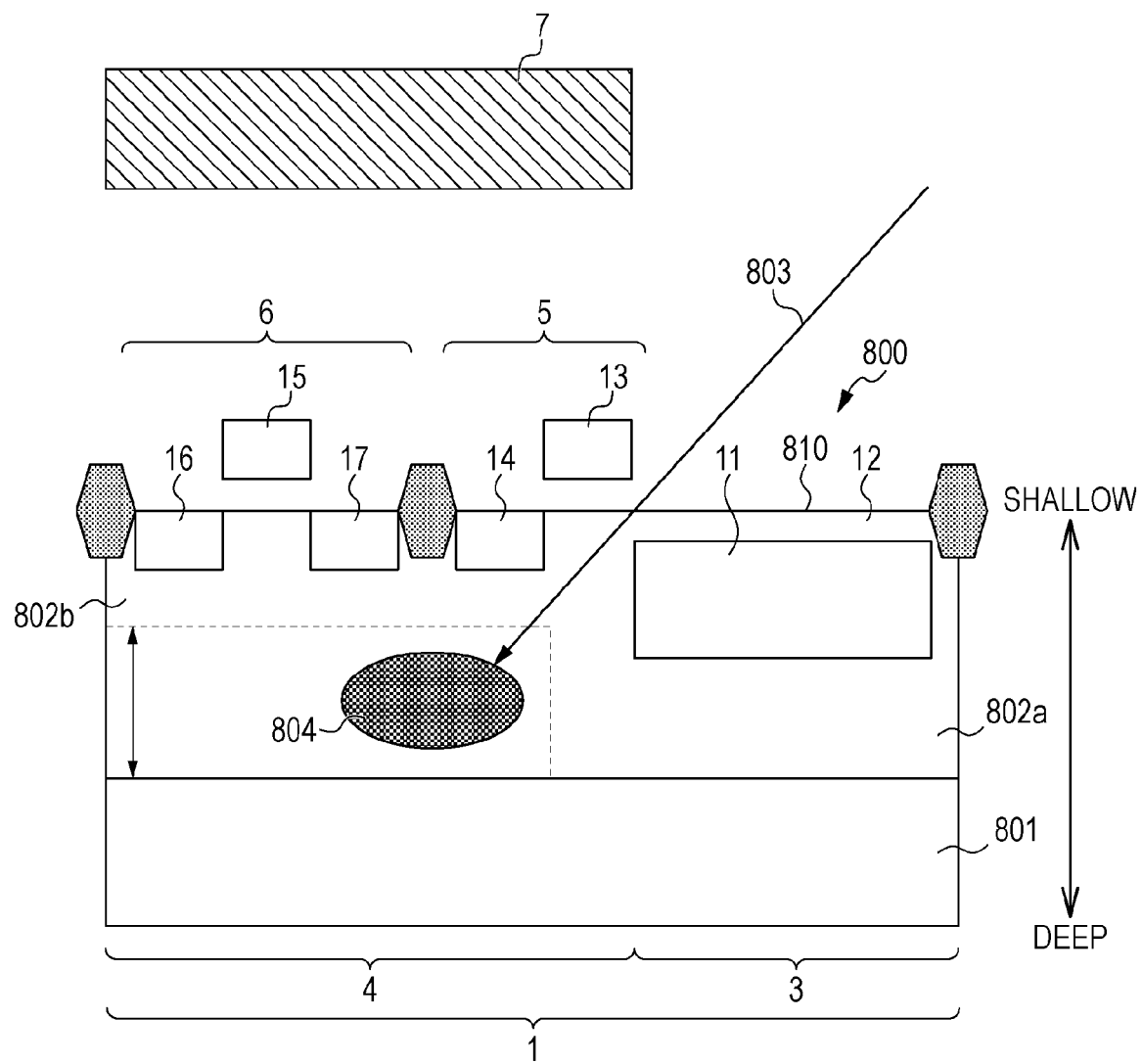
FIG. 8 is a schematic cross-sectional view of the X-ray detection apparatus according to the fourth exemplary embodiment.

An X-ray detection apparatus 800 according to a fourth exemplary embodiment of the present invention is described below. FIG. 8 is a schematic illustration of the planar structure of a detection unit 1 of the X-ray detection apparatus 800. The same reference symbol is used for an element which performs the same or a similar function as an element illustrated in FIG. 1 (the first exemplary embodiment) or FIG. 5 (the second exemplary embodiment), and detailed description of the element is not repeated. The fourth exemplary embodiment differs from the first to third exemplary embodiments in terms of the internal structure of a semiconductor substrate 801. A structure that differs from that of the first to third exemplary embodiments is described below. The other structures can be the same as those of any one of the first to third exemplary embodiments.

According to the present exemplary embodiment, the semiconductor substrate 801 is an N-type semiconductor substrate. A P-type well 802 is disposed in the semiconductor substrate 801. The P-type well 802 includes a first well 802a disposed in the conversion unit 3 and a second well 802b disposed in the circuit unit 4. The N-type semiconductor region 11 and the P-type semiconductor region 12 that form the conversion unit 3 are disposed inside the first well 802a. The N-type semiconductor region 11 and the first well 802a form a P-N junction. That is, the P-type semiconductor region 12, the N-type semiconductor region 11, and the first well 802a form a buried type photodiode. The semiconductor regions of the transfer transistor 5 and the amplifier transistor 6 are disposed in the second well 802b. Note that while, for simplicity, description has been made with reference to two wells (i.e., the first well 802a and the second well 802b), the two wells may serve as a single semiconductor region in reality. However, two semiconductor regions may correspond to the first well 802a and the second well 802b.

A first feature of the present exemplary embodiment is characterized in that an N-type semiconductor region (the semiconductor substrate 801) having an opposite conductive type is disposed under the P-type well 802 having the semiconductor regions disposed therein. A second feature is characterized in that the lower end of the first well 802a is deeper than the lower end of the second well 802b. As used herein, a reference depth is the level of a principal surface 810 adjacent to the transfer gate electrode 13 and the gate electrode 15 of the amplifier transistor 6. As a level inside the semiconductor substrate is nearer to the principal surface 810, the level is shallower. In contrast, as a level inside the semiconductor substrate is farther from the principal surface 810, the level is deeper. In terms of a vertically-structured relationship inside the semiconductor substrate, if a first component that is closer to the principal surface 810 than a second component, the first component is located above the second component. In contrast, if a first component that is farther from the principal surface 810 than a second component, the first component is located under the second component. In addition, the lower end of the semiconductor region can be defined as a P-N junction interface of the P-type well 802 and the semiconductor substrate 801.

A method for producing the P-type well 802 having such a structure is briefly described next. An N-type semiconductor substrate 801 is prepared first. Subsequently, a first mask having an opening at a position corresponding to the first well 802a is formed. The first well 802a is formed by ion injection using the first mask. Thereafter, a second mask having an opening at a position corresponding to the second well 802b is formed. The second well 802b is formed by ion injection using the second mask. By varying the energy of ion injection, the first well 802a and the second well 802b having their lower ends at different depths can be formed.

Another method for producing the P-type well 802 is described below. An N-type semiconductor substrate 801 is prepared, and a P-type semiconductor region having a uniform depth is formed throughout a region in which the P-type well 802 is disposed. Subsequently, the P-type semiconductor region is formed, using ion injection, in only a region corresponding to the first well 802a at a level deeper than the level of the P-type semiconductor region previously formed. Alternatively, N-type counter impurities (donors) may be ion-injected to only a region corresponding to the second well 802b. Note that the above-described methods are only examples. Another known method may be employed in order to form the P-type well 802.

An advantage of the present exemplary embodiment is described next. According to the present exemplary embodiment, the N-type semiconductor substrate 801 is disposed under the P-type well 802. Accordingly, a potential gradient is formed in the border between the P-type well 802 and the semiconductor substrate 801 so that an electron travels from the P-type well 802 to the semiconductor substrate 801. That is, the P-type well 802 can function as a potential barrier for an electron in the semiconductor substrate 801.

Although the circuit unit 4 is covered by the shielding unit 7, a plurality of electrons may be generated in the circuit unit 4 by, for example, a soft X-ray 803 that is diagonally incident on the circuit unit 4. That is, although the circuit unit 4 is covered by the shielding unit 7, a region in the vicinity of the circuit unit 4 may be included in a charge generation region 804. According to the structure of the present exemplary embodiment, the probability of an electron generated at a point in the vicinity of the lower end of the second well 802b or a point that is deeper than the lower end of the second well 802b being collected by the conversion unit 3 is low due to the potential barrier. In addition, the lower end of the second well 802b of the circuit unit 4 is located at a shallow level. Therefore, an electron generated in a region that is shallower than the lower end of the second well 802b of the circuit unit 4 tends to be discharged to, for example, the power supply unit located in the vicinity. That is, an electron generated in the circuit unit 4 is easily discharged to, for example, the power supply unit without being collected by the conversion unit 3. In contrast, in the conversion unit 3, the lower end of the first well 802a is located at a deep level. Accordingly, an electron generated in the conversion unit 3 is negligibly discharged to the semiconductor substrate 801.

As described above, if some of the generated electrons are collected by the conversion unit 3 and the other electrons are discharged to a region other than the conversion unit 3, a signal that does not accurately indicate the energy of the soft X-ray radiation may be output. By reading all of the generated electrons or discharging all of the generated electrons, a signal that accurately indicates the energy of the soft X-ray radiation can be obtained. According to the structure of the present exemplary embodiment, if soft X-ray radiation is incident on the conversion unit 3, the probability of all of the generated electrons being collected by the conversion unit 3 can be increased. In addition, if soft X-ray radiation is incident on the circuit unit 4, the probability of all of the generated electrons being discharged can be increased. As a result, the soft X-ray radiation can be more accurately detected.

Note that the equivalent circuit and the planar structure of the detection unit 1 according to the present exemplary embodiment can be the same as those of the detection unit 1 according to any one of the first to third exemplary embodiments. In addition, the modification described in the first exemplary embodiment is applicable to the detection unit 1.

Fifth Exemplary Embodiment

Figure 9:
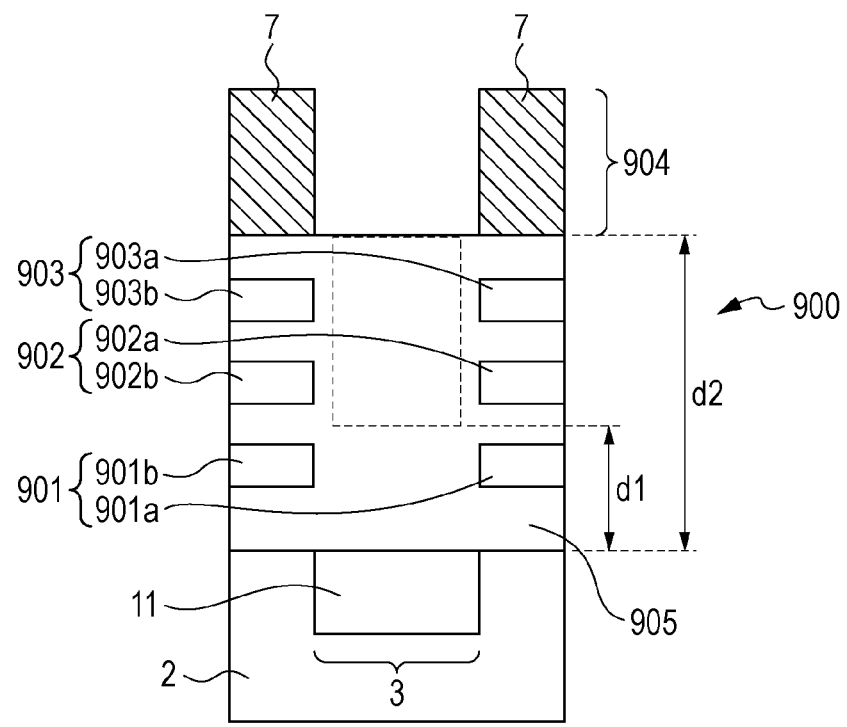
FIG. 9 is a schematic cross-sectional view of the X-ray detection apparatus according to the fifth exemplary embodiment.

An X-ray detection apparatus 900 according to a fifth exemplary embodiment of the present invention is described below. FIG. 9 is a schematic cross-sectional view of the planar structure of a detection unit 1 of the X-ray detection apparatus 900. The same reference symbol is used for an element which performs the same or a similar function as an element illustrated in FIG. 1 (the first exemplary embodiment), FIG. 5 (the second exemplary embodiment), or FIG. 8 (the fourth exemplary embodiment), and detailed description of the element is not repeated. The present exemplary embodiment is characterized by the structure of an insulating body disposed on the semiconductor substrate 2. A structure that differs from those of the first to fourth exemplary embodiments is described below. The other structures can be the same as those of any one of the first to fourth exemplary embodiments.

Three wiring layers 901 to 903 are disposed above the semiconductor substrate 2. The first wiring layer 901 includes conductive members 901a and 901b. The second wiring layer 902 is disposed on the first wiring layer 901. The second wiring layer 902 includes conductive members 902a and 902b. The third wiring layer 903 is disposed on the second wiring layer 902. The third wiring layer 903 includes conductive members 903a and 903b. The conductive members are made of aluminum. A fourth wiring layer 904 is disposed above the three wiring layers 901 to 903. The fourth wiring layer 904 includes the shielding unit 7. That is, among the plurality of wiring layers, the shielding unit 7 is included in a wiring layer that is the farthest from the semiconductor substrate 2.

Each of the conductive members 901a and 903b serves as an interconnection line. For example, the conductive member 901a serves as an output line that outputs a signal from the conversion unit 3. For example, the conductive member 901b serves as an interconnection line that connects an FD to the gate electrode of an amplifier transistor. For example, the conductive members 902a and 902b serve as interconnection lines that supply voltages to a transfer gate electrode and the gate electrode of a reset transistor. In addition, for example, the conductive members 903a and 903b serve as interconnection lines that supply a power supply voltage.

The conductive members 901a and 903b and the shielding unit 7 are insulated from one another by an interlayer insulating film 905. For example, a silicon oxide film can be used as the interlayer insulating film 905. According to the present exemplary embodiment, a thickness d1 of the interlayer insulating film 905 disposed on the conversion unit 3 is less than a distance d2 between the surface of the semiconductor substrate 2 and the surface of the shielding unit 7 adjacent to the semiconductor substrate 2. That is, in the conversion unit 3, the thickness of the interlayer insulating film 905 is decreased. In addition, according to the present exemplary embodiment, a microlens that collects light is not disposed on the conversion unit 3. According to such a structure, since the thickness of a member that is disposed on the conversion unit 3 is small, the amount of absorbed soft X-ray radiation can be reduced. That is, the sensitivity can be increased.

The conductive members are formed from, for example, aluminum or copper. In particular, a material having an electric conductivity higher than that of a material that forms the shielding unit 7 may be used for the conductive members. Each of aluminum and copper has an electric conductivity higher than that of tantalum.

A barrier metal may be disposed between the interlayer insulating film 905 and each of the conductive members 901a to 903b as needed. The barrier metal can reduce diffusion of a metal that forms the interconnection lines. Accordingly, the metal diffusion coefficient of the barrier metal can be lower than that of the interlayer insulating film 905. The material of the barrier metal may be tantalum, tungsten, or titanium. Note that since the barrier metal need not have an excellent electrical conductivity, the film thickness of the barrier metal can be less than that of the conductive member in contact with the barrier metal. In contrast, the shielding unit 7 need not be in contact with another conductive member. However, the shielding unit 7 may be in contact with another conductive member. In such a case, the film thickness of the shielding unit 7 may be greater than the film thickness of the conductive member in contact with the shielding unit 7. Alternatively, the film thickness of the shielding unit 7 may be greater than that of the barrier metal.

According to such a structure, the shielding function and the signal transmitting function can be achieved by different wiring layers. Therefore, a high shielding performance and a high signal transmitting performance can be easily obtained at the same time.

The equivalent circuit and the planar structure of the detection unit 1 according to the present exemplary embodiment can be the same as those of any one of the first to fourth embodiments. In addition, the modification described in the first exemplary embodiment is applicable to the present exemplary embodiment. The structure of the present exemplary embodiment can be combined with the structure of one of the first to fourth exemplary embodiments. For example, each of the wiring structure and the structure of the interlayer insulating film 905 may be independently combined with the structure of one of the first to fourth exemplary embodiments. If each of the wiring structure and the structure of the interlayer insulating film 905 is combined with the second exemplary embodiment, the shielding unit 7 is disposed on the soft X-ray incidence side, and the wiring layers 901 to 903 are disposed on the opposite side. Note that the need for a microlens may be eliminated in each of the first to fourth exemplary embodiments.

Sixth Exemplary Embodiment

Figure 10:
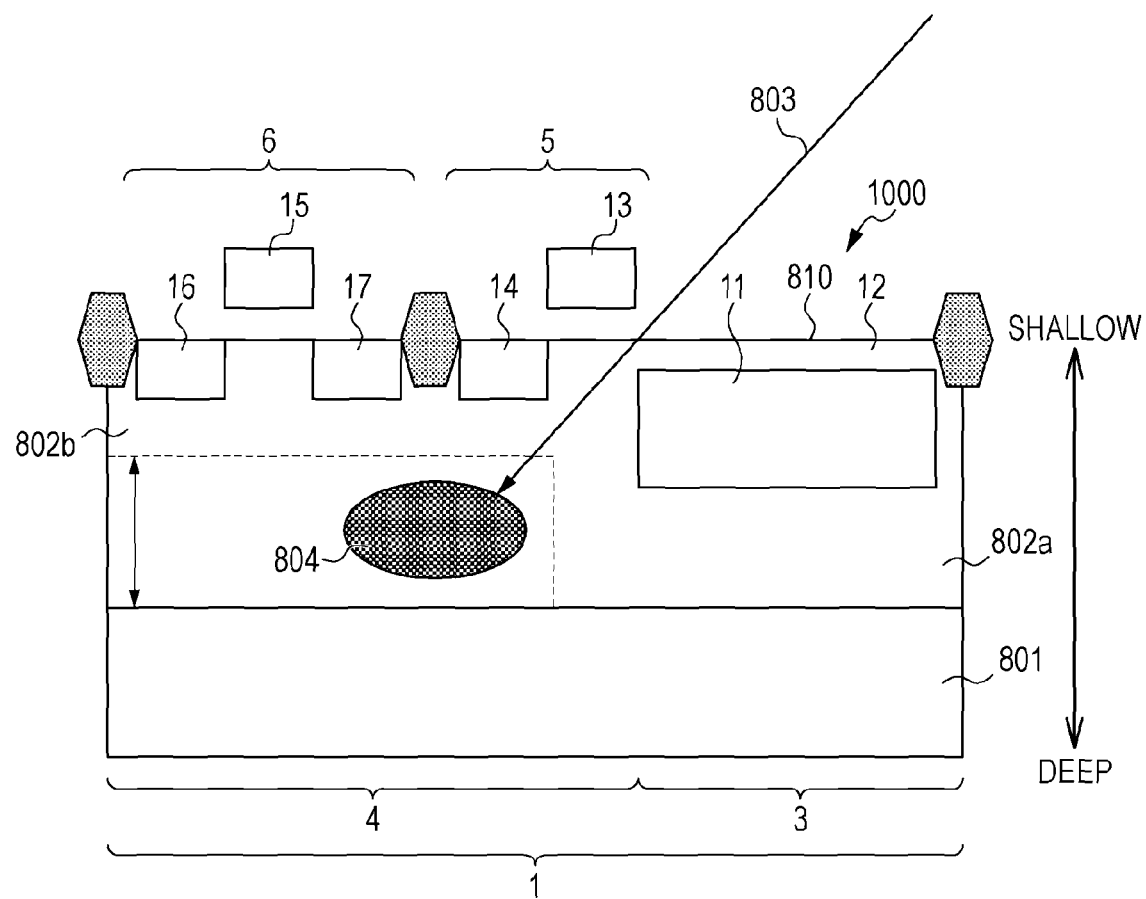
FIG. 10 is a schematic cross-sectional view of an X-ray detection apparatus according to a sixth exemplary embodiment.

A soft X-ray detection apparatus 1000 according to a sixth exemplary embodiment of the present invention is described below. FIG. 10 is a schematic cross-sectional view of the soft X-ray detection apparatus 1000 according to the present exemplary embodiment. In FIG. 10, the same reference symbol is used for an element which performs the same or a similar function as an element illustrated in FIG. 8 (the fourth exemplary embodiment), and detailed description of the element is not repeated. The soft X-ray detection apparatus 1000 according to the present exemplary embodiment is characterized in that it does not include the shielding unit 7. The other structures can be the same as those of the fourth exemplary embodiment. That is, as a modification of the fourth exemplary embodiment, the need for the shielding unit 7 can be eliminated.

This is because as described in the fourth exemplary embodiment, by using the P-type well 802a of the conversion unit 3 and the P-type well 802b of the circuit unit 4 having their lower ends at different depths, a soft X-ray can be accurately detected. As described above, among electrons generated upon incidence of a soft X-ray on the semiconductor substrate 2, only some of the electrons are read. This is the issue to be solved in order to more accurately detect the soft X-ray. It is highly likely that electric charge generated upon incidence of the soft X-ray on the circuit unit 4 is completely discharged due to the well structure of the present exemplary embodiment. That is, even when the shielding unit 7 is removed, the soft X-ray can be accurately detected by using only such a P-type well structure.

Seventh Exemplary Embodiment

Figure 11:
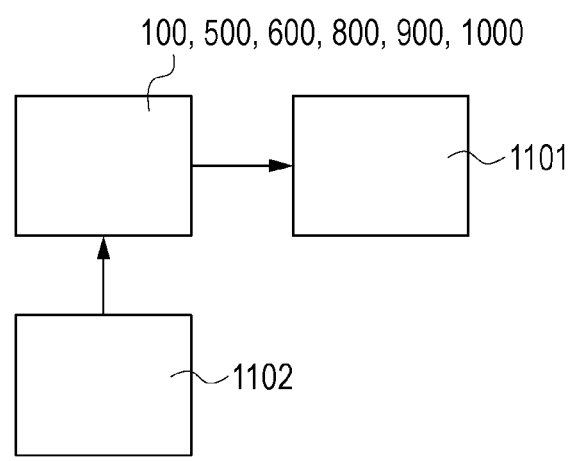
FIG. 11 is a block diagram of an X-ray detection system according to a seventh exemplary embodiment.

An exemplary embodiment of a soft X-ray detection system including the soft X-ray detection apparatus according to the above-described exemplary embodiment is described below with reference to FIG. 11. According to the present exemplary embodiment, the soft X-ray detection system includes any one of the soft X-ray detection apparatuses 100, 500, 600, 800, 900, and 1000 according to the first to sixth exemplary embodiments, respectively. The soft X-ray detection system further includes a signal processing circuit 1101 that processes a signal output from the soft X-ray detection apparatus and a drive circuit 1102 that drives the soft X-ray detection apparatus. A well-known circuit applicable to the solid-state image pickup device can be used as each of the signal processing circuit 1101 and the drive circuit 1102. Part or the entirety of the signal processing circuit 1101 and part or the entirety of the drive circuit 1102 may be disposed on a single semiconductor substrate. Alternatively, the signal processing circuit 1101 or the drive circuit 1102 is disposed on a semiconductor substrate different from the semiconductor substrate of the soft X-ray detection apparatus.

In addition, the soft X-ray detection system may include a propulsion device. For example, the propulsion device controls the position of the soft X-ray detection system in satellite orbit. Alternatively, the propulsion device may be a rocket engine that moves the soft X-ray detection system from the surface of the earth into satellite orbit. The propulsion device may be configured to be removable.

An example of a method for driving the soft X-ray detection system is described next. In order to measure the energy of a soft X-ray, the drive circuit 1102 drives the soft X-ray detection apparatus so that the average number of photons incident on one of the detection units during one accumulation period is less than one. That is, a sufficiently short accumulation period can be set on the basis of the amount of the incident soft X-ray. More specifically, the amount of a soft X-ray can be expressed as the number of photons emitted per unit area and per unit time. Accordingly, if the number of photons emitted to one of the detection units per unit time is computed using the area of the detection unit, the accumulation period can be determined. Thereafter, after one accumulating operation is performed, the soft X-ray detection apparatus outputs a signal carrier in the form of a signal, and the signal processing circuit 1101 generates an image. The image can be generated by mapping the energy of the soft X-ray incident on each of the detection units to a two-dimensional plane.

In addition, in order to detect the amount (the strength) of the incident soft X-ray, that is, in order to detect the number of photons, the above-described accumulating operation can be repeatedly performed multiple times, and a signal can be read each time the accumulating operation is performed. For example, if the soft X-ray emitted from the sun is detected on a satellite orbit of the earth, several hundred photons may be incident on one of the detection units of the soft X-ray detection apparatus per second. In order to measure the number and the energy of photons, several hundred to several thousand images need to be captured and read per second. In order to read the images at high speed using a CCD soft X-ray detection apparatus, the number of the detection units need to be decreased and, thus, the resolution of the image need to be reduced. In contrast, since the soft X-ray detection apparatus according to the present exemplary embodiment has an amplifier unit in each of the detection units, high-speed image capturing can be performed without sacrificing the resolution of the image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-171973 filed Aug. 5, 2011, which is hereby incorporated by reference herein in its entirety.

What is claimed is:

1. A detection apparatus configured to detect soft X-ray radiation, comprising:
   a semiconductor substrate including a conversion unit and a circuit unit; and
   a shielding unit configured to reduce an amount of soft X-ray radiation incident on the semiconductor substrate;
   wherein the conversion unit includes a plurality of conversion elements disposed in the semiconductor substrate, and the conversion elements convert the soft X-ray radiation incident on the semiconductor substrate into an electric charge,
   wherein the circuit unit includes a plurality of amplifier transistors having a source region and a drain region disposed in the semiconductor substrate where the plurality of conversion elements are disposed, and the amplifier transistors output a signal on the basis of the electric charge generated by the conversion elements,
   wherein the shielding unit is disposed above gate electrodes of the amplifier transistors, and
   wherein the shielding unit is disposed so that a projection of at least a first part of the shielding unit onto the semiconductor substrate overlaps the source region and the drain region of the amplifier transistor included in the circuit unit.

2. The detection apparatus according to claim 1, wherein the shielding unit is disposed so that a projection of a second part of the shielding unit onto the semiconductor substrate overlaps the conversion element disposed in the semiconductor substrate.

3. The detection apparatus according to claim 2, wherein the first part of the shielding unit and the second part of the shielding unit are disposed so as to be continuous.

4. The detection apparatus according to claim 2, wherein the first part of the shielding unit and the second part of the shielding unit are disposed so as to be separated from each other.

5. The detection apparatus according to claim 2, wherein the second part of the shielding unit is disposed so as to overlap a first region of the conversion element disposed in the semiconductor substrate within a predetermined distance from a boundary between the conversion unit and the circuit unit, and
   wherein the shielding unit does not overlap a second region of the conversion element disposed in the semiconductor substrate excluding the first region.

6. The detection apparatus according to claim 5, wherein the predetermined distance ranges from 0.1 micrometer to 2.0 micrometer.

7. The detection apparatus according to claim 5, wherein the predetermined distance is greater than a radius of the smallest sphere that encloses a region in which electric charge is generated when a photon of the soft X-ray radiation is incident on the semiconductor substrate.

8. The detection apparatus according to claim 5, wherein when L denotes the predetermined distance in micrometer, the predetermined distance L is set to a value defined by the following equation:

$$L = 0.85 \times E^{\frac{7}{4}} \times 10^{-2}$$

where E denotes an energy in keV of the soft X-ray radiation incident on the semiconductor substrate.

9. The detection apparatus according to claim 1, further comprising:
   a plurality of wiring layers disposed on the semiconductor substrate and including at least a first wiring layer and a second wiring layer;
   wherein the shielding unit is included in the first wiring layer, and
   wherein, among materials that form interconnection lines included in the second wiring layer, an electrical conductivity of at least one of the materials is higher than an electrical conductivity of a material that forms the shielding unit.

10. The detection apparatus according to claim 9, wherein the first wiring layer is disposed so as to be the farthest from the semiconductor substrate among the plurality of wiring layers.

11. The detection apparatus according to claim 9, wherein the shielding unit is included in each of at least two wiring layers including the first wiring layer.

12. The detection apparatus according to claim 9, wherein the interconnection line included in the second wiring layer includes a first conductive member and a second conductive member that is disposed so as to be in contact with the first conductive member and that has an electrical conductivity lower than an electrical conductivity of the first conductive member, and
wherein a thickness of the shielding unit is greater than a thickness of the second conductive member.

13. The detection apparatus according to claim 12, wherein the second conductive member reduces diffusion of a material that forms the first conductive member.

14. The detection apparatus according to claim 1, wherein each of the conversion elements includes a first semiconductor region of a first conductive type into which the electric charge is collected and a second semiconductor region of a second conductive type disposed under the first semiconductor region,
wherein the circuit unit includes a third semiconductor region of the second conductive type, in which the source region and the drain region of the amplifier transistor are disposed,
wherein a fourth semiconductor region of the first conductive type is disposed under the second semiconductor region and under the third semiconductor region, and
wherein a P-N junction that the second semiconductor region and the fourth semiconductor region form is deeper than a P-N junction that the third semiconductor region and the fourth semiconductor region form.

15. The detection apparatus according to claim 1, wherein a thickness of the shielding unit ranges from 0.5 micrometer to 1.0 micrometer.

16. The detection apparatus according to claim 1, wherein the shielding unit is formed so as to include a material having a soft X-ray shielding coefficient higher than a soft X-ray shielding coefficient of each of aluminum and copper.

17. The detection apparatus according to claim 1, wherein the shielding unit is formed so as to include a material having an atomic number higher than or equal to 70.

18. The detection apparatus according to claim 1, wherein the material that forms the shielding unit is one of tungsten, tantalum, and gold.

19. The detection apparatus according to claim 1, further comprising:
an insulating member disposed on the semiconductor substrate;
wherein a thickness of a portion of the insulating member located above the conversion unit is less than a distance between the surface of the semiconductor substrate and the shielding unit.

20. The detection apparatus according to claim 1, wherein a microlens is not disposed on the conversion unit.

21. The detection apparatus according to claim 1, wherein a wavelength conversion unit that converts soft X-ray radiation having a wavelength ranging from 0.1 nm to 10 nm into an electromagnetic wave having a wavelength shorter than 0.1 nm or a wavelength longer than 10 nm is not disposed.

22. The detection apparatus according to claim 1, wherein the wavelength of the soft X-ray radiation incident on the semiconductor substrate is in a range from 0.1 nm to 10 nm.

23. The detection apparatus according to claim 1, wherein the energy of the soft X-ray radiation incident on the semiconductor substrate is less than or equal to 10 keV.

24. A detection apparatus configured to detect soft X-ray radiation, comprising:
a semiconductor substrate including a conversion unit and a circuit unit; and
a shielding unit configured to reduce an amount of soft X-ray radiation incident on the semiconductor substrate;
wherein the conversion unit includes a plurality of conversion elements disposed in the semiconductor substrate, and the conversion elements convert the soft X-ray radiation incident on the semiconductor substrate into electric charge,
wherein the circuit unit includes a plurality of amplifier transistors having a source region and a drain region disposed in the semiconductor substrate where the plurality of conversion elements are disposed, and the amplifier transistors output a signal on the basis of the electric charge generated by the conversion elements,
wherein gate electrodes of the amplifier transistors are disposed on a first principal surface of two principal surfaces of the semiconductor substrate,
wherein the shielding unit is disposed on a second principal surface of the semiconductor substrate opposite to the first principal surface, and
wherein the shielding unit is disposed so that a projection of at least a first part of the shielding unit onto the semiconductor substrate overlaps the source region and the drain region of the amplifier transistor included in the circuit unit.

25. A detection apparatus configured to detect soft X-ray radiation, comprising:
a semiconductor substrate including a conversion unit and a circuit unit;
wherein the conversion unit has a plurality of conversion elements disposed therein, and the conversion elements convert soft X-ray radiation incident on the semiconductor substrate into electric charge,
wherein the circuit unit has a plurality of amplifier transistors disposed therein, and the amplifier transistors output a signal on the basis of the electric charge generated by the conversion elements,
wherein each of the conversion elements includes a first semiconductor region of a first conductive type into which the electric charge is collected and a second semiconductor region of a second conductive type disposed under the first semiconductor region, and
wherein the circuit unit includes a third semiconductor region of the second conductive type, in which a source region and a drain region of the amplifier transistor are disposed,
wherein a fourth semiconductor region of the first conductive type is disposed under the second semiconductor region and under the third semiconductor region, and
wherein a P-N junction that the second semiconductor region and the fourth semiconductor region form is deeper than a P-N junction that the third semiconductor region and the fourth semiconductor region form.

26. A detection apparatus configured to detect soft X-ray radiation, comprising:
a semiconductor substrate including a conversion unit and a circuit unit;
a shielding unit configured to reduce an amount of soft X-ray radiation incident on the semiconductor substrate; and
a plurality of wiring layers disposed on the semiconductor substrate and including at least a first wiring layer and a second wiring layer;

wherein the conversion unit has a plurality of conversion elements disposed therein, and the conversion elements convert the soft X-ray radiation incident on the semiconductor substrate into electric charge, wherein the circuit unit has a plurality of amplifier transistors disposed therein, and the amplifier transistors output a signal on the basis of the electric charge generated by the conversion elements, wherein the shielding unit is disposed above gate electrodes of the amplifier transistors, wherein the shielding unit is disposed so that a projection of at least a first part of the shielding unit onto the semiconductor substrate overlaps the circuit unit, wherein the shielding unit is disposed so that a projection of a second part of the shielding unit onto the semiconductor substrate overlaps the conversion unit, wherein the second part of the shielding unit is disposed so as to overlap a first region of the conversion unit within a predetermined distance from a boundary between the conversion unit and the circuit unit, wherein the shielding unit is included in the first wiring layer, wherein the shielding unit is formed so as to include a material having a soft X-ray shielding coefficient higher than a soft X-ray shielding coefficient of each of aluminum and copper, wherein, among materials that form interconnection lines included in the second wiring layer, an electrical conductivity of at least one of the materials is higher than an electrical conductivity of a material that forms the shielding unit, wherein the interconnection line included in the second wiring layer includes a first conductive member and a second conductive member that is disposed so as to be in contact with the first conductive member and that has an electrical conductivity lower than an electrical conductivity of the first conductive member, wherein the second conductive member reduces diffusion of a material that forms the first conductive member, and wherein a thickness of the first part of the shielding unit is greater than a thickness of the second conductive member.

27. A detection apparatus configured to detect soft X-ray radiation, comprising:

a semiconductor substrate including a conversion unit and a circuit unit;

a shielding unit configured to reduce an amount of soft X-ray radiation incident on the semiconductor substrate; and a plurality of wiring layers disposed on the semiconductor substrate and including at least a first wiring layer and a second wiring layer;

wherein the conversion unit has a plurality of conversion elements disposed therein, and the conversion elements convert the soft X-ray incident on the semiconductor substrate into electric charge, wherein the circuit unit has a plurality of amplifier transistors disposed therein, and the amplifier transistors output a signal on the basis of electric charge generated by the conversion elements, wherein the plurality of wiring layers and gate electrodes of the amplifier transistors are disposed on a first principal surface of two principal surfaces of the semiconductor substrate, wherein the shielding unit is disposed on a second principal surface of the semiconductor substrate opposite to the first principal surface, wherein the shielding unit is disposed so that a projection of at least first part of the shielding unit onto the semiconductor substrate overlaps the circuit unit, wherein the shielding unit is disposed so that a projection of second part of the shielding unit onto the semiconductor substrate overlaps the conversion unit, wherein the second part of the shielding unit is disposed so as to overlap a first region of the conversion unit within a predetermined distance from a boundary between the conversion unit and the circuit unit, wherein the shielding unit is included in the first wiring layer, wherein the shielding unit is formed so as to include a material having a soft X-ray shielding coefficient higher than a soft X-ray shielding coefficient of each of aluminum and copper, wherein among materials that form interconnection lines included in the second wiring layer, an electrical conductivity of at least one of the materials is higher than an electrical conductivity of a material that forms the shielding unit, wherein the interconnection line included in the second wiring layer includes a first conductive member and a second conductive member that is disposed so as to be in contact with the first conductive member and that has an electrical conductivity lower than an electrical conductivity of the first conductive member, wherein the second conductive member reduces diffusion of a material that forms the first conductive member, and wherein a thickness of the first part of the shielding unit is greater than a thickness of the second conductive member.

28. A detection system configured to detect soft X-ray radiation, comprising:

the detection apparatus according to claim 1; and a signal processing circuit configured to process a signal output from the detection apparatus;

wherein the signal processing circuit calculates an energy of the soft X-ray radiation incident on the semiconductor substrate on the basis of the signal.

29. A detection system configured to detect soft X-ray radiation, comprising:

the detection apparatus according to claim 1; and a signal processing circuit configured to process a signal output from the detection apparatus;

wherein the signal processing circuit generates an image on the basis of the signal.

* * * * *